United States Patent
Imura

(10) Patent No.: US 8,278,854 B2
(45) Date of Patent: Oct. 2, 2012

(54) CONTROL DEVICE FOR ELECTRIC ROTATING MACHINE

(75) Inventor: Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 12/725,731

(22) Filed: Mar. 17, 2010

(65) Prior Publication Data

US 2010/0259204 A1 Oct. 14, 2010

(30) Foreign Application Priority Data

Apr. 10, 2009 (JP) .................................. 2009-096444

(51) Int. Cl.
*H02H 7/08* (2006.01)
(52) U.S. Cl. ............... 318/400.21; 318/400.02; 318/811
(58) Field of Classification Search ............. 318/400.21, 318/400.02, 811, 810, 798, 799, 806, 809, 318/805, 803; 361/132
See application file for complete search history.

(56) References Cited

U.S. PATENT DOCUMENTS

| | | |
|---|---|---|
| 5,872,710 A | 2/1999 | Kameyama |
| 5,903,128 A | 5/1999 | Sakakibara et al. |
| 2002/0089321 A1 * | 7/2002 | Matsuda ...................... 324/142 |

FOREIGN PATENT DOCUMENTS

| | | |
|---|---|---|
| JP | 07-007968 | 1/1995 |
| JP | 09-084363 | 3/1997 |
| JP | 09-121558 | 5/1997 |
| JP | 10-164850 | 6/1998 |
| JP | 2000-245163 | 9/2000 |
| JP | 3935543 | 3/2007 |
| JP | 2008-228419 | 9/2008 |

OTHER PUBLICATIONS

Japanese Office Action dated Jan. 18, 2011, issued in corresponding Japanese Application No. 2009-096444 with English translation.

* cited by examiner

*Primary Examiner* — Karen Masih
(74) *Attorney, Agent, or Firm* — Nixon & Vanderhye PC

(57) ABSTRACT

A control device has a unit for selecting each of controlled voltages outputted from an inverter to a generator, a unit for judging a polarity of a current flowing through the generator, a unit for predicting a current of the generator from each selected voltage to be outputted from the inverter in the succeeding period, while performing the prediction based on the current polarity each time the selected voltage differs from the voltage already outputted from the inverter in the present period, a unit for determining one voltage corresponding to one predicted current nearest to an instructed current among the predicted currents, and a unit for controlling the generator by controlling the inverter to change the voltage already outputted from the inverter to the determined voltage and to apply the determined voltage to the generator in the succeeding period.

15 Claims, 13 Drawing Sheets

| VOLTAGE VECTORS | SWITCHING ELEMENTS SET AT ON STATE | | |
|---|---|---|---|
| | U-PHASE | V-PHASE | W-PHASE |
| V0 | ESun | ESvn | ESwn |
| V1 | ESup | ESvn | ESwn |
| V2 | ESup | ESvp | ESwn |
| V3 | ESun | ESvp | ESwn |
| V4 | ESun | ESvp | ESwp |
| V5 | ESun | ESvn | ESwp |
| V6 | ESup | ESvn | ESwp |
| V7 | ESup | ESvp | ESwp |

FIG. 3
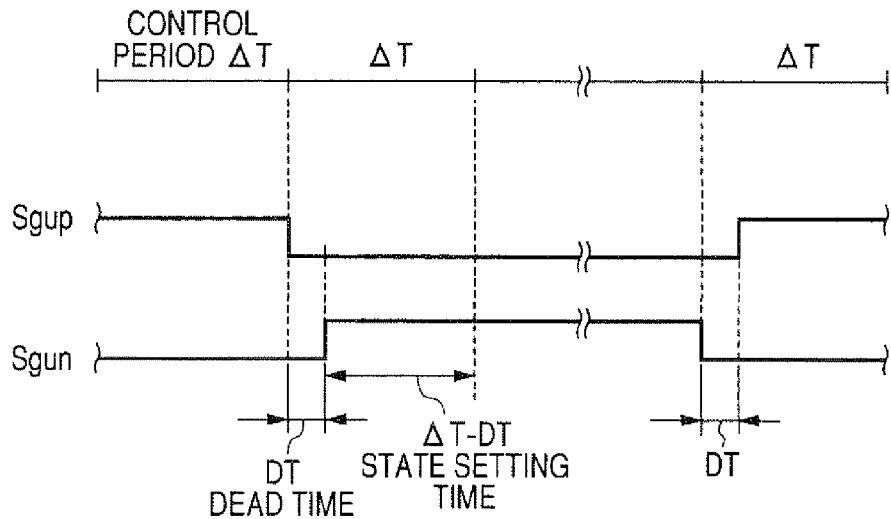
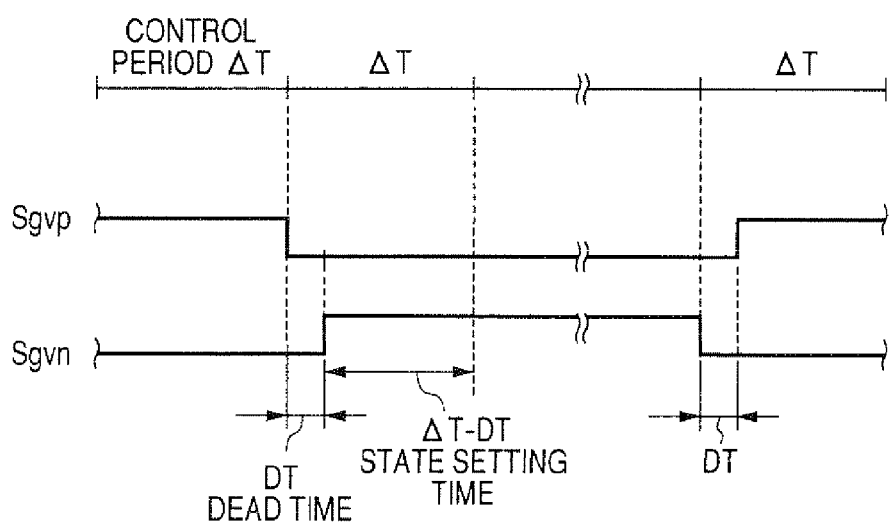
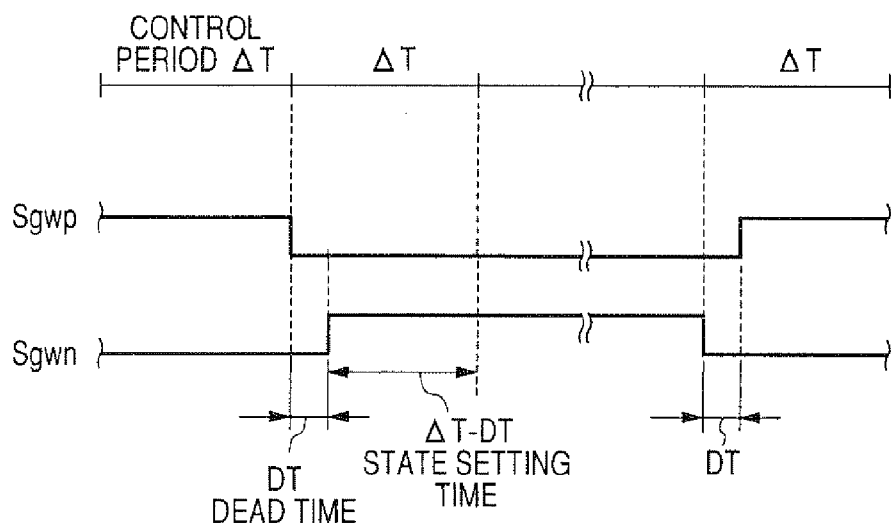

FIG. 4
(a) V1 IN PRESENT CONTROL PERIOD
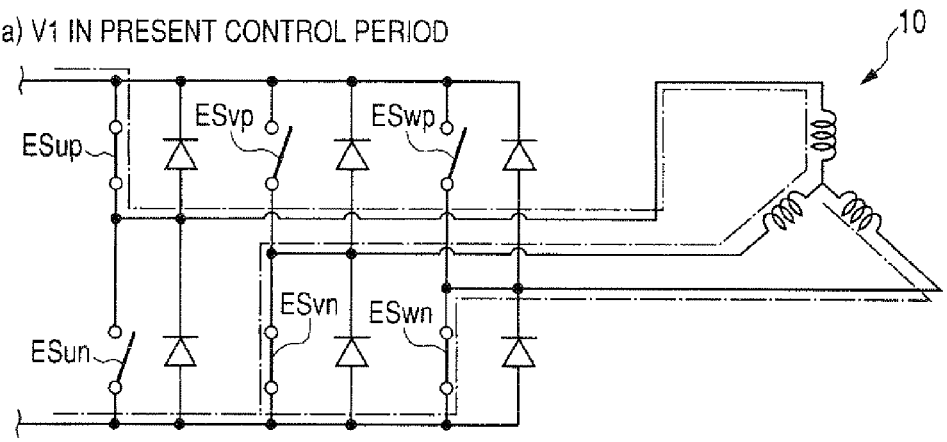
(b) DEAD TIME
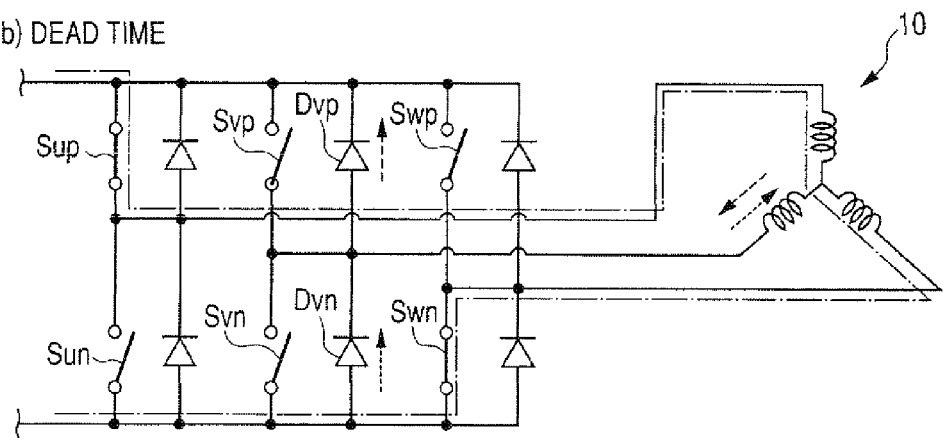
(c) V2 IN SUCCEEDING CONTROL PERIOD
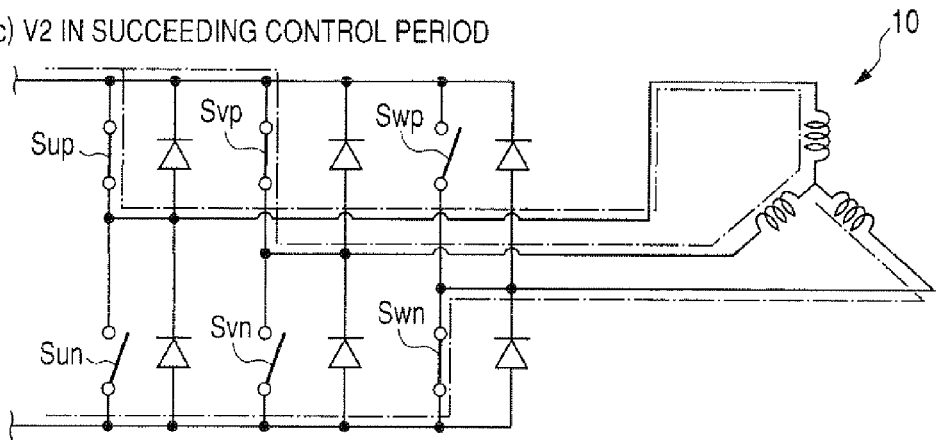

FIG. 6

|  | Iu>0<br>Iv>0<br>Iw>0 | Iu>0<br>Iv>0<br>Iw<0 | Iu>0<br>Iv<0<br>Iw>0 | Iu<0<br>Iv>0<br>Iw>0 | Iu>0<br>Iv<0<br>Iw<0 | Iu<0<br>Iv>0<br>Iw<0 | Iu<0<br>Iv<0<br>Iw>0 | Iu<0<br>Iv<0<br>Iw<0 |
|---|---|---|---|---|---|---|---|---|
| V1↔V4<br>V0↔V7<br>V2↔V5<br>V3↔V6 | V0 | V5 | V3 | V1 | V4 | V6 | V2 | V7 |

|  | Iu>0<br>Iv>0 | Iu<0<br>Iv>0 | Iu>0<br>Iv<0 | Iu<0<br>Iv<0 |
|---|---|---|---|---|
| V1↔V3<br>V0↔V2 | V0 | V1 | V3 | V2 |
| V4↔V6<br>V5↔V7 | V5 | V6 | V4 | V7 |

|  | Iu>0<br>Iw>0 | Iu<0<br>Iw>0 | Iu>0<br>Iw<0 | Iu<0<br>Iw<0 |
|---|---|---|---|---|
| V1↔V5<br>V0↔V6 | V0 | V1 | V5 | V6 |
| V2↔V4<br>V3↔V7 | V3 | V2 | V4 | V7 |

|  | Iv>0<br>Iw>0 | Iv<0<br>Iw>0 | Iv>0<br>Iw<0 | Iv<0<br>Iw<0 |
|---|---|---|---|---|
| V0↔V4<br>V3↔V5 | V0 | V3 | V5 | V4 |
| V1↔V7<br>V2↔V6 | V1 | V2 | V6 | V7 |

|  | Iu>0 | Iu<0 |
|---|---|---|
| V0↔V1 | V0 | V1 |
| V2↔V3 | V3 | V2 |
| V4↔V7 | V4 | V7 |
| V5↔V6 | V5 | V6 |

|  | Iv>0 | Iv<0 |
|---|---|---|
| V1↔V2 | V1 | V2 |
| V0↔V3 | V0 | V3 |
| V4↔V5 | V5 | V4 |
| V6↔V7 | V6 | V7 |

|  | Iw>0 | Iw<0 |
|---|---|---|
| V0↔V5 | V0 | V5 |
| V1↔V6 | V1 | V6 |
| V2↔V7 | V2 | V7 |
| V3↔V4 | V3 | V4 |

CONTROL DEVICE FOR ELECTRIC ROTATING MACHINE

CROSS-REFERENCE TO RELATED APPLICATION

This application is based upon and claims the benefit of priority of the prior Japanese Patent Application 2009-96444 filed on Apr. 10, 2009, so that the contents of which are incorporated herein by reference.

BACKGROUND OF THE INVENTION

1. Field of the Invention

The present invention relates to a control device which controls a controlled variable of a multiphase electric rotating machine by controlling a power inverting circuit having a plurality of switching elements and freewheel diodes connected with input and output terminals of the respective switching elements such that each switching element electrically connects or disconnects a positive electrode or a negative electrode of a direct current power source to or from one of terminals of the machine.

2. Description of Related Art

A control device for a three-phase motor has been used. For example, this device performs pulse width modulation (PWM) control, based on triangular wave comparison, for the motor to control three phase currents, actually flowing through respective phase windings of the motor, to an instructed value under the feed-back control. In this PWM control, an instructed value of phase voltages to be applied from an inverter to the respective phase windings of the motor is calculated, and switching elements of the inverter are operated based on the difference between the level of a carrier signal shaped in a triangular wave and the instructed value.

However, when this PWM control is performed in an excessive modulation region in which the instructed voltage value is higher than an input voltage of the inverter, levels of higher harmonic waves contained in the output voltage of the inverter increase. In this case, the higher harmonic waves undesirably influence the response characteristics of the phase currents flowing through the motor. This problem is arisen because it is assumed in the design of a current control system that the output voltage of the inverter can be always set at the instructed value.

To avoid this problem, Published Japanese Patent First Publication No. 2008-228419 proposes a model prediction control performed in a control device. In this control, a plurality of operating states of an inverter applying a voltage to a three-phase motor are preset, a current expected to flow through the motor is predicted from the output voltage of the inverter, on the assumption that the inverter is set in one operating state, for each of the operating states, and the inverter is actually set in one operating state which minimizes the difference between the predicted current and an instructed current. Therefore, because the inverter is operated so as to optimize the variation of the predicted current, the problem described above can be avoided to a certain degree.

Japanese Patent Specification No. 393554 also proposes a control device for a three-phase motor.

However, even when the current is predicted in the model prediction control, the predicted current includes an error. Therefore, the current actually flowing through the motor is still shifted from the instructed current, and the difference between the actual current and the instructed current sometimes becomes large. The error occurring in the predicted current is derived from an error arisen in the model prediction control.

This error is not only generated in the current prediction, but also generated in the prediction of a controlled variable (e.g., torque or magnetic field) of the electric rotating machine.

SUMMARY OF THE INVENTION

An object of the present invention is to provide, with due consideration to the drawbacks of the conventional control device, a control device which controls a controlled variable of an electric rotating machine while predicting the controlled variable according to a model of prediction-based control with high precision.

According to a first aspect of this invention, the object is achieved by the provision of a control device, which controls a controlled variable of an electric rotating machine by controlling a power inverting circuit to be set in one of a plurality of controlled states corresponding to respective control led voltages of the power inverting circuit, comprising a state determining section and a control section. The determining section determines one of the controlled states as a controlled state to be set in the power inverting circuit. The control section controls the power inverting circuit to change one controlled state, already set in the power inverting circuit, to the controlled state determined by the state determining section and to apply the controlled voltage, corresponding to the controlled state determined by the state determining section, to the electric rotating machine. The state determining section comprises a current polarity judging unit, a predicting unit, and a state determining unit. The judging unit judges a polarity of a current which flows through the electric rotating machine in response to the controlled voltage corresponding to the controlled state already set in the power inverting circuit. The predicting unit predicts the controlled variable of the electric rotating machine from information, indicating one controlled state to be set in the power inverting circuit, while performing the prediction based on the polarity of the current judged by the current polarity judging unit when the controlled state indicated by the information differs from the controlled state already set in the power inverting circuit, for each of the controlled states indicated by the information. The state determining unit determines the control led state, to be set in the power inverting circuit, from the predicted controlled variables corresponding to the controlled states.

With this structure of the control device, when the controlled state indicated by the information differs from the controlled state already set in the power inverting circuit, the polarity of the current influences the operation of the power inverting circuit. In this case, the control section sometimes sets one controlled state, differentiated from the controlled state determined by the state determining unit, in the power inverting circuit in a transfer time and sets the control led state determined by the state determining unit in the power inverting circuit in a state setting time succeeding the transfer time. Therefore, assuming that the prediction of the predicting unit is performed regardless of the polarity of the current, it is difficult to predict the current with high precision.

For example, the power inverting circuit has a first switching element, a second switching element and two freewheel diodes connected with input and output terminals of the respective switching elements. The first switching element set in anon state electrically connects a positive electrode of a direct current power source to a terminal of the electric rotating machine, while the first switching element set in an off state electrically disconnects the positive electrode of the direct current power source from the terminal of the electric rotating machine. The second switching element set in the on state electrically connects a negative electrode of the direct current power source from the terminal of the electric rotating machine, while the second switching element set in the off state electrically disconnects the negative electrode of the direct current power source from the terminal of the electric rotating machine. When the controlled state indicated by the information differs from the controlled state already set in the power inverting circuit, the control unit sets the switching elements at the off state together in the transfer time to avoid the formation of a short circuit (i.e., on states set in the switching elements) in the power inverting circuit. Therefore, when the polarity of the current is positive, the current flows into the electric rotating machine in the transfer time while passing through the freewheel diode corresponding to the second switching element. In contrast, when the polarity of the current is negative, the current flows out the electric rotating machine in the transfer time while passing through the freewheel diode corresponding to the first switching element. Therefore, the controlled state set in the power inverting circuit in the transfer time is sometimes differentiated from the controlled state determined by the state determining unit.

In the present invention, each time the controlled state indicated by the information differs from the controlled state already set in the power inverting circuit, the prediction of the predicting unit is performed based on the polarity of the current.

Accordingly, the control device can predict the controlled variable of the electric rotating machine with high precision according to the model prediction control to appropriately control the electric rotating machine.

According to a second aspect of this invention, the object is achieved by the provision of a control device, which controls a controlled variable of an electric rotating machine by controlling a power inverting circuit to be set in one of a plurality of controlled states corresponding to respective controlled voltages of the power inverting circuit, comprising the state determining section and the control section. The state determining section comprises a difference calculating unit, a predicting unit and a state determining unit. The difference calculating unit receives a voltage actually applied to the electric rotating machine by the power inverting circuit and calculates a difference between the actual voltage and the controlled voltage corresponding to the controlled state of the power inverting circuit already set in the power inverting circuit. The predicting unit receives information indicating each of the controlled states to be set in the power inverting circuit, corrects the controlled voltage corresponding to the controlled state indicated by the received information according to the difference calculated by the difference calculating unit to obtain a corrected voltage, and predicts the controlled variable of the electric rotating machine from the corrected voltage, to be applied to the electric rotating machine, for each of the controlled states indicated by the information. The state determining unit determines one controlled state from the predicted controlled variables corresponding to the controlled states.

With this structure of the control device, the predicting unit predicts the controlled variable of the electric rotating machine according to the voltage actually applied to the electric rotating machine, the state determining unit determines one controlled state from the predicted controlled variables, and the control section controls the power inverting circuit to apply the controlled voltage, corresponding to the controlled state determined by the state determining section, to the electric rotating machine. Therefore, the control device performs the feed-back control based on the voltage detected from the electric rotating machine to control the electric rotating machine.

Accordingly, the control device can predict the controlled variable such that the controlled voltage, corresponding to the controlled state determined by the state determining section, approaches the voltage actually applied to the electric rotating machine.

BRIEF DESCRIPTION OF THE DRAWINGS

FIG. 3 is a timing chart of a pair of two control signals corresponding to each phase of a multiphase motor;

FIG. 4 is an explanatory view showing a flow direction of a current in a dead time of a control period;

FIG. 6 shows a dead time voltage vector determined in a compensating unit shown in FIG. 1 according to polarities of phase current(s) when one of two voltage vectors is changed to the other vector;

DETAILED DESCRIPTION OF THE PREFERRED EMBODIMENTS

Figure 1:
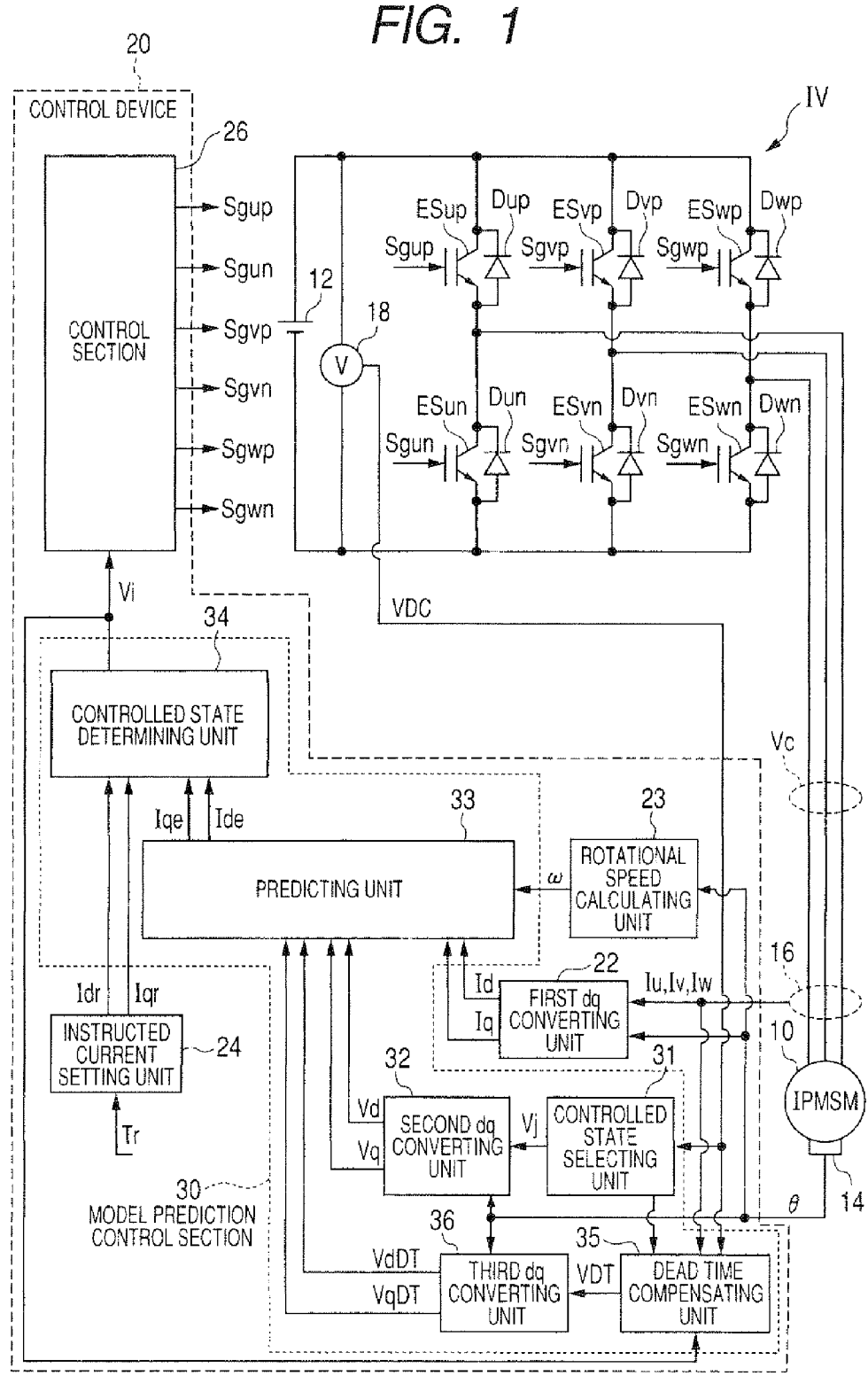
FIG. 1 is a view showing the structure of a control system having a control device according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a view showing the structure of a control system having a control device for a motor generator according to the first embodiment.

As shown in FIG. 1, a high-voltage battery 12 supplies a direct current to a control system 11, the control system 11 converts this direct current into an alternating current of a controlled voltage Vc, and a motor generator 10 is driven by this alternating current to produce a driving torque. This power generating system including the generator 10, the system 11 and the battery 12 is, for example, mounted on a hybrid vehicle. The generator 10 represents an electric rotating machine whose feature is the presence of magnetic saliency. More specifically, the generator 10 is a three-phase interior permanent magnet synchronous motor (IPMSM). This motor has a rotor, permanent magnets having salient poles and being disposed around a shaft of the rotor so as to be protruded from the shaft, a stator surrounding the rotor, and three windings (i.e., a U-phase winding, a V-phase winding and a W-phase winding) wound on the stator.

The control system 11 has an inverter IV, representing a power inverting circuit, for producing the controlled voltage Vc from a supply voltage VDC of the battery 12 and supplying a three-phase electric current (i.e., a U-phase current Iu, a V-phase current Iv and a W-phase current Iw defined on the uvw coordinate system) having the controlled voltage Vc to the generator 10 such that the current flows through the generator 10 as a controlled variable of the generator 10, a voltage sensor 18 for detecting the supply voltage VDC, a current sensor 16 for detecting the phase currents Iu, Iv and Iq, and a rotational angle sensor 14 for detecting a rotational angle θ of the rotor of the generator 10 rotated in response to the phase currents.

The control system 11 further has a control device 20, composing a low voltage system, for receiving information of the rotational angle θ, information of the phase currents Iu, Iv and Iq, information of the supply voltage VDC from the sensors 14, 16 and 18 through an interface (not shown), receiving information of a target torque Tr and controlling the controlled voltage Vc of the inverter IV according to the received information to control the generator 10.

The inverter IV has U-phase switching elements ESup and ESun serially connected with each other, V-phase switching elements ESvp and ESvn serially connected with each other, W-phase switching elements ESwp and Swn serially connected with each other. Each switching element is made of an n-p-n insulated-gate bipolar transistor (IGBT). The emitters of the switching elements ESup, ESvp and ESwp are connected with the collectors of the respective switching elements ESun, ESvn and ESwn. The collectors of the switching elements ESup, ESvp and ESwp are connected with the higher voltage terminal of the battery 12, while the emitters of the switching elements ESun, ESvn and ESwn are connected with the lower voltage terminal of the battery 12. The connecting point of the elements ESup and ESun is connected with the U-phase stator winding of the generator 10. The connecting point of the elements ESvp and ESvn is connected with the V-phase stator winding of the generator 10. The connecting point of the elements ESwp and ESwn is connected with the W-phase stator winding of the generator 10.

The inverter IV further has a plurality of diodes Dup, Dun, Dvp, Dvn, Dwp and Dwn connected with the respective switching elements in parallel. The anode of each diode is connected with the emitter of the corresponding switching element. Therefore, the direction of a current allowed to flow through each diode is opposite to the direction of a current possible to flow through the corresponding switching element. Each diode acts as a freewheel diode.

The control device 20 produces control signals Sgup, Sgun, Sgvp, Sgvn, Sgwp and Sgwn from the received information and transmits the signals Sgup, Sgun, Sgvp, Sgvn, Sgwp and Sgwn to bases of the respective switching elements ESup, Esun, Esvp, Esvn, ESwp and Eswn of the inverter IV to invert the direct current of the supply voltage VDC of the direct current into the alternating current of the controlled voltage Vc.

The control device 20 operates the inverter IV to indirectly control the torque actually produced in the generator 10 to the target torque Tr. More specifically, the device 20 operates the inverter IV to directly control the alternating current, actually flowing through the generator 10, to an instructed current required for the generator 10 to generate the target torque Tr. That is, in this embodiment, although the device 20 controls the torque of the generator 10 as a final controlled variable, the device 20 directly controls a current, actually flowing through the generator 10, to the instructed current to control the torque of the generator 10.

The inverter IV can be set in any of a plurality of controlled states (or operating states). Each controlled state corresponds to a pattern of on and off states of the switching elements. A voltage vector of the controlled voltage Vc applied from the inverter IV to the generator 10 depends on the controlled state set in the inverter IV. The device 20 predicts (i.e., estimates in advance) a current flowing through the generator 10 from information, indicating one controlled state imaginarily set in the inverter IV, for each of the controlled states indicated by the information, and determines one controlled state corresponding to one predicted current, closest to the instructed current among the predicted currents, as a controlled state to be actually set in the inverter IV. This control is called a model prediction control in this specification.

Figures 2A, 2B:
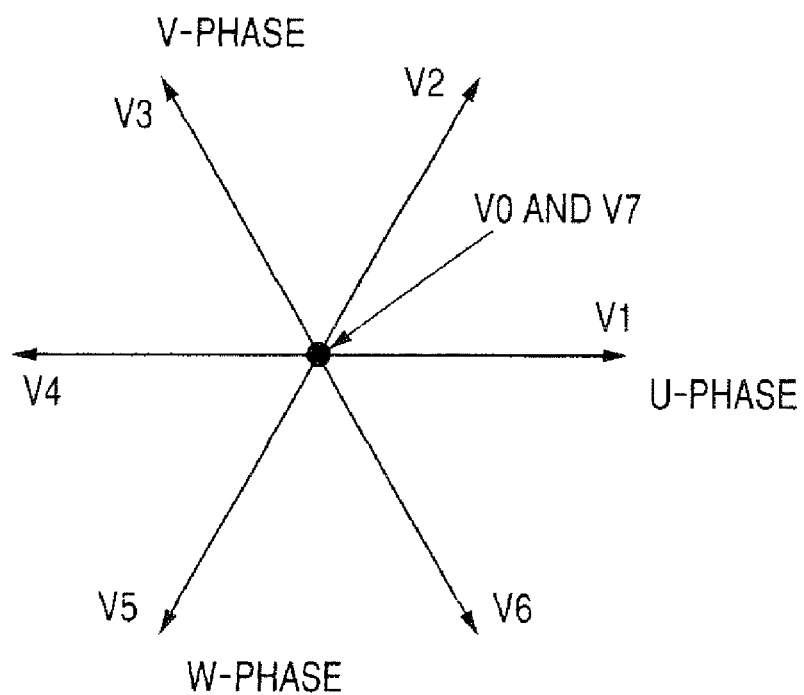
FIG. 2A shows the relation between voltage vectors of a controlled voltage and controlled states of an inverter shown in FIG. 1.
FIG. 2B shows directions and magnitudes of the voltage vectors.

FIG. 2A shows the relation between voltage vectors of the controlled voltage Vc and switching elements set in on states, while FIG. 2B shows directions and magnitudes of the voltage vectors Vi. As shown in FIG. 2A and FIG. 2B, the controlled voltage Vc can have any of eight voltage vectors Vi (i=0, 1, - - - , 7) corresponding to eight controlled states of the inverter IV. For example, when the switching elements Esun, Esvn and Eswn on the lower electric potential side are set in the on state while the switching elements Esup, Esvp and Eswp on the high electric potential side are set in the off state, the control voltage Vc has the voltage vector V0. When the switching elements Esup, Esvp and Eswp are set in the on state while the switching elements Esun, Esvn and Eswn are set in the off state, the controlled voltage Vc has the voltage vector V7. In the case of the voltage vectors V0 and V7, all phases of the generator 10 are short-circuited, so that the value of the controlled voltage Vc is set at zero. Therefore, each of the voltage vectors V0 and V7 is called a zero vector. In contrast, when at least one of the switching elements Esun, Esvn and Eswn and at least one of the switching elements Esup, Esvp and Eswp are set in the on state, the controlled voltage Vc has one of the voltage vectors V1 to V6 having magnitudes larger than zero. Therefore, each of the voltage vectors V1 to V6 is called a non-zero vector.

As shown in FIG. 2B, the voltage vector V1 obtained by setting only the switching element Esup in the on state is directed toward the U-phase and has the positive value, the voltage vector V3 obtained by setting only the switching element Esvp in the on state is directed toward the V-phase and has the positive value, and the voltage vector V5 obtained by setting only the switching element Eswp in the on state is directed toward the W-phase and has the positive value.

The control device 20 shown in FIG. 1 controls the generator 10 every control period of time ΔT. That is, the device 20 determines one controlled state in the present control period of time, produces the control signals corresponding to the determined controlled state, and controls the inverter IV to be set in the determined controlled state in the succeeding control period according to the control signals.

The control device 20 has a first dq converting unit 22 for converting phase currents Iu, Iv and Iw detected in the sensor 16 into an actual current (i.e. an actual d-axis current Id and an actual q-axis current Iq defined on the dq rotational coordinate system) Idq by using the rotational angle θ of the sensor 14, a rotational speed calculating unit 23 for performing a differential calculation for the rotational angle θ with respect to time to obtain an electrical angle rotational speed ω of the rotor of the generator 10, and an instructed current setting unit 24 for setting an instructed current (i.e., an instructed d-axis current Idr and an instructed q-axis current Iqr defined on the dq rotational coordinate system) Idqr from information indicating the target torque Tr.

The control device 20 further has a model prediction control section (i.e., a state determining section) 30 for determining one voltage vector Vi of the controlled voltage Vc from the voltage vector of the inverter IV set in the present control period, information about the actual currents Id and Iq, the instructed currents Idr and Iqr, the rotational speed ω, the rotational angle θ and the supply voltage VDC, and a control section 26 for producing the control signals Sgup, Sgun, Sgvp, Sgvn, Sgwp and Sgwn from the voltage vector Vi determined by the section 30 and supplying the signals to the inverter IV such that the inverter IV is set in the controlled state corresponding to the determined voltage vector Vi.

The dq rotational coordinate system is rotated with the rotor of the generator 10. The d-axis of the system is set so as to be directed from one S magnetic pole to the corresponding N magnetic pole in the rotor. The q-axis of the system is set to be orthogonal to the d-axis on a plane perpendicular to the rotation axis of the rotor. The original point of this system is placed on the rotation axis of the rotor. The units of the control device 20 are operated every control period of time.

The operation of the control section 26 will be described with reference to FIG. 3. FIG. 3 is a timing chart of pairs of two control signals corresponding to respective phases of the generator 10.

When one controlled state of the inverter IV set in the present control period is changed to another controlled state to be set in the next control period, one of two switching elements ESup and ESun, one of two switching elements ESvp and ESvn, or one of two switching elements ESwp and ESwn corresponding to at least one phase of the generator 10 is changed in a transfer time from the on state to the off state, and the other switching element is changed in the transfer time from the off state to the on state. Assuming that two switching elements corresponding to one phase of the generator 10 are set at the on state together in the transfer time, a short circuit is formed between the switching elements. To prevent the formation of the short circuit, the control section 26 performs a dead time producing process.

As shown in FIG. 3, in this process, when states of two switching elements corresponding to at least one phase of the generator 10 are changed to change a first controlled state of the inverter IV set in the present control period to a second controlled state set in the succeeding control period, the switching elements are set at the off state together and is maintained in the period of a dead time (i.e., a transfer time) DT which succeeds a state setting time ΔT-DT placed in the present control period ΔT, and one of the switching elements is changed to the on state at the start of the state setting time and is maintained in the state setting time.

More specifically, the timing T1 of changing the off state of the switching element ESun, ESvn, or ESwn of the lower voltage side to the on state is delayed by the dead time DT from the timing T2 of changing the on state of the switching element ESup, ESvp, or ESwp of the higher voltage side to the off state. In the same manner, the timing T3 of changing the off state of the switching element ESup, ESvp, or ESwp of the higher voltage side to the on state is delayed by the dead time DT from the timing T4 of changing the on state of the switching element of the lower voltage side to the off state. Therefore, the switching elements corresponding to at least one phase of the generator 10 are set in the off state together in the dead time DT.

In contrast, when states of two switching elements corresponding to one phase of the generator 10 are maintained in one control period ΔT, no dead time is placed in the control period, and the state setting time accords with the control period.

As shown in FIG. 1, the control section 30 has a controlled state selecting unit 31 for producing the voltage vectors V0 to V7 from information of the supply voltage VDC and selecting each of the voltage vectors V0 to V7 as the controlled state of the inverter IV corresponding to the selected voltage vector. Each voltage vector is defined on the uvw coordinate system. A phase component of the voltage vector is expressed by the value VDC/2 when the corresponding switching element Esup, Esvp or Eswp is set in the on state, while the phase component of the voltage vector is expressed by the value −VDC/2 when the corresponding switching element Esun, Esvn or Eswn is set in the on state. For example, the voltage vector V0 is expressed by (−VDC/2, −VDC/2, −VDC/2), and the voltage vector V1 is expressed by (VDC/2, −VDC/2, −VDC/2).

The control section 30 further has a second dq converting unit 32 for converting each of the voltage vectors selected in the selecting unit 31 into a voltage vector (Vd, Vq) of the controlled voltage Vc, defined on the dq rotational coordinate system, by using the rotational angle θ.

The control section 30 further has a predicting unit 33 for predicting an alternating current composed of a d-axis current Ide and a q-axis current Iqe, on the assumption that the inverter IV is set in the succeeding control period in each of the controlled states selected in the selecting unit 31, from the information indicating the voltage vector of the converting unit 32, information indicating the actual currents Id and Iq of the converting unit 22 detected at the present time, and the rotational speed ω of the calculating unit 23. The predicted current is expected to flow through the generator 10 at a time elapsed by one control period from the setting of the selected controlled state in the inverter IV.

In this current prediction, voltage equations (c1) and (c2):

$$Vd=(R+pLd)Id-\omega LqIq \qquad (c1)$$

$$Vq=\omega LdId+(R+pLq)Iq+\omega\phi \qquad (c2)$$

are used. The variables Vd and Vq denote a d-axis voltage component and a q-axis voltage component of a controlled voltage Vc applied to the generator 10, the variables Id and Iq denote a d-axis current and a q-axis current flowing through the generator 10, the parameter R denotes the resistance of the armature winding, the parameters Ld and Lq denote the d-axis inductance and the q-axis inductance, and the parameter φ is a constant of armature winding linkage magnetic fluxes. A differential operator p (i.e., d/dt) with respect to time is used.

A differential equation (c3) of a differential term pId of the d-axis current Id is obtained as a state equation by rearranging the terms of the equation (c1), and a differential equation (c4)

of a differential term pIq of the q-axis current Iq is obtained as a state equation by rearranging the terms of the equation (c1).

$$pId=-(R/Ld)Id+\omega(Lq/Ld)Iq+Vd/Ld \quad (c3)$$

$$pIq=-\omega(Ld/Lq)Id-(R/Lq)Iq+Vq/Lq-\omega\phi/Lq \quad (c4)$$

The combination of the equations (c3) and (c4) is expressed as follows:

$$\frac{d}{dt}\begin{pmatrix}Id\\Iq\end{pmatrix}=\begin{pmatrix}-\frac{R}{Ld} & \omega\frac{Lq}{Ld}\\-\omega\frac{Ld}{Lq} & -\frac{R}{Lq}\end{pmatrix}\begin{pmatrix}Id\\Iq\end{pmatrix}+\begin{pmatrix}\frac{1}{Ld} & 0\\0 & \frac{1}{Lq}\end{pmatrix}\begin{pmatrix}Vd\\Vq\end{pmatrix}+\begin{pmatrix}0\\-\frac{\omega\phi}{Lq}\end{pmatrix}$$

From the actual currents Id and Iq flowing through the generator 10 in the present period of time (i.e., a first control period of time) and the voltages Vd and Vq applied to the generator 10 in the succeeding control period of time (i.e., a second control period of time succeeding the first control period), the predicting unit 33 predicts currents Ide and Iqe expected to flow through the generator 10 at a time elapsed by one control period from the setting time of the controlled voltage Vc=(Vd, Vq), on the assumption that the controlled voltage Vc=(Vd, Vq) is applied to the generator 10 in the succeeding control period, according to the equations (c3) and (c4). In this prediction, the difference calculus is, for example, applied for the equations (c3) and (c4) to set discrete variables every control period and to predict the currents Ide and Iqe from the discrete variables.

The control section 30 further has a controlled state determining unit 34 for calculating a value of a predicting function J from the predicted currents Ide and Iqe of the predicting unit 33 and the instructed currents Idr and Iqr of the setting unit 24, each time the voltage vector is selected in the selecting unit 31, and determining one controlled state corresponding to the value of the function J, indicating the highest level of prediction, as a controlled state to be actually set in the inverter IV in the state setting time of the succeeding control period.

More specifically, the value of the function J(edq) is evaluated by the squared magnitude $edq^2=(Idr-Ide)^2+(Iqr-Iqe)^2$ of the current difference vector (Idr−Ide, Iqr−Iqe) between the instructed current vector Idqr=(Idr, Iqr) and the predicted current vector Idqe=(Ide, Iqe). Although each component of the current difference vector becomes positive or negative, the squared magnitude is always positive. In this case, the value of the function J can be increased with the difference between the vectors Idqr and Idqe. That is, when the prediction level is set to be lowered with the increase of the value of the function J, the function J can be defined such that the prediction level is lowered with the increase of the difference in each component between the vectors Idqr and Idqe. Therefore, the determining unit 34 determines the controlled state of the inverter IV such that the value of the function corresponding to the determined controlled state is minimized.

The control section 26 produces the control signals according to the controlled state determined in unit 34 every control period ΔT, and controls the inverter IV to be set in the determined controlled state according to the control signals. In this case, when the controlled state determined in unit 34 in the present control period differs from the controlled state determined in unit 34 in the preceding control period, the control section 26 performs the dead time producing process so as to set two switching elements in one pair, corresponding to at least one phase of the generator 10, at the off state together during the dead time DT (see FIG. 3). Therefore, the controlled state of the inverter IV substantially set in the dead time DT is sometimes differentiated from the controlled state determined in unit 34 in the present control period.

FIG. 4 is an explanatory view showing a flow direction of a current in the dead time DT. As shown in FIG. 4, for example, the voltage vector V1 set in the present control period (i.e., first control period) is changed to the voltage vector V2 of the controlled voltage Vc in the succeeding control period (i.e., second control period). In this case, the switching elements ESup, ESvn and ESwn corresponding to the voltage vector V1 are set in the on state, while the switching elements ESup, ESvp and ESwn corresponding to the voltage vector V2 are set in the on state. Therefore, in this change of the controlled state, the switching elements ESvp and ESvn corresponding to the V-phase are set in the off state together in the dead time DT of the succeeding control period.

When the v-phase current actually flowing through the v-phase winding of the generator 10 is positive at the start of the dead time DT, the v-phase current flows into the v-phase winding in the dead time DT. In this case, the v-phase current passes through the diode Dvn in the dead time DT to flow into the v-phase winding, and the v-phase winding is set at the electric potential equivalent to that of the negative electrode of the battery 12. In contrast, when the v-phase current actually flowing through the v-phase winding is negative at the start of the dead time DT, the v-phase current flows out the v-phase winding in the dead time DT. In this case, the v-phase current passes through the diode Dvp in the dead time DT to flow out the v-phase winding, and the v-phase winding is set at the electric potential equivalent to that of the positive electrode of the battery 12.

Therefore, when the v-phase current flows into the v-phase winding (i.e., the v-phase current is positive) at the start of the dead time DT, the control voltage Vc of the inverter IV has the vector equivalent to the voltage vector V1. In contrast, when the v-phase current flows out the v-phase winding (i.e., the v-phase current is negative) at the start of the dead time DT, the control voltage Vc has the vector equivalent to the voltage vector V2.

In this embodiment, to compensate for the difference between the controlled state (i.e., the voltage vector) determined in unit 34 and the controlled state substantially set in the inverter IV in the dead time DT in response to the determination of the unit 34, when the controlled state determined in the unit 34 to be set in the inverter IV in the succeeding control period differs from the controlled state determined in the unit 34 in the preceding control period and set in the inverter IV in the present control period, the device 20 predicts the current according to polarities of the phase currents which actually flow through the phase windings of the generator 10 and are detected in the sensor 16 at the start of the dead time DT. The polarity of the current is defined as a flow direction of the current. When the current is set at a positive level at the start of the dead time DT, the current flows into the generator 10 during the dead time DT. Therefore, the polarity of the current is positive. In contrast, when the current is set at a negative level at the start of the dead time DT, the current flows out the generator 10 during the dead time DT. Therefore, the polarity of the current is negative.

The structure and operation of the control device 20 required to predict the current according to the polarity of each phase current will be described.

As shown in FIG. 1, the control section 30 further has a dead time compensating unit (i.e., a current polarity judging unit) 35 for judging polarities of the phase currents Iu, Iv and Iw detected in the sensor 16 at the present time, determining one of the voltage vectors as a dead time voltage vector (i.e., an intermediate voltage vector) VDT=(VdDT, VqDT) of the controlled voltage Vc, appearing in the dead time DT preceding the state setting time of the succeeding control period, when the voltage vector Vj(n) (j=0, 1, - - - , 7) selected in the selecting unit 31 differs from the voltage vector V(n−1) determined in the unit 34 in the preceding control period to be set in the inverter IV in the present control period, from the judged polarities of the phase currents Iu, Iv and Iw, the voltage vectors V(n−1) and Vj(n), and information indicating the supply voltage VDC detected in the sensor 18. The control section 30 further has a third dq converting unit 36 for converting the voltage vector VDT defined on the uvw coordinate system into a voltage vector VDT=(VdDT, VqDT) of the controlled voltage Vc, defined on the dq rotational coordinate system, by using the angle θ of the sensor 14.

To predict the current from the voltages Vd and Vq of the equations (3) and (4) and the voltages VdDT and VqDT in the predicting unit 33, the voltages Vd and Vq are determined from the voltage vector (Vd, Vq) selected in the units 31 and 32, and the voltages VdDT and VqDT are determined from the voltage vector VDT=(VdDT, VqDT) of the units 35 and 36.

Figure 5:
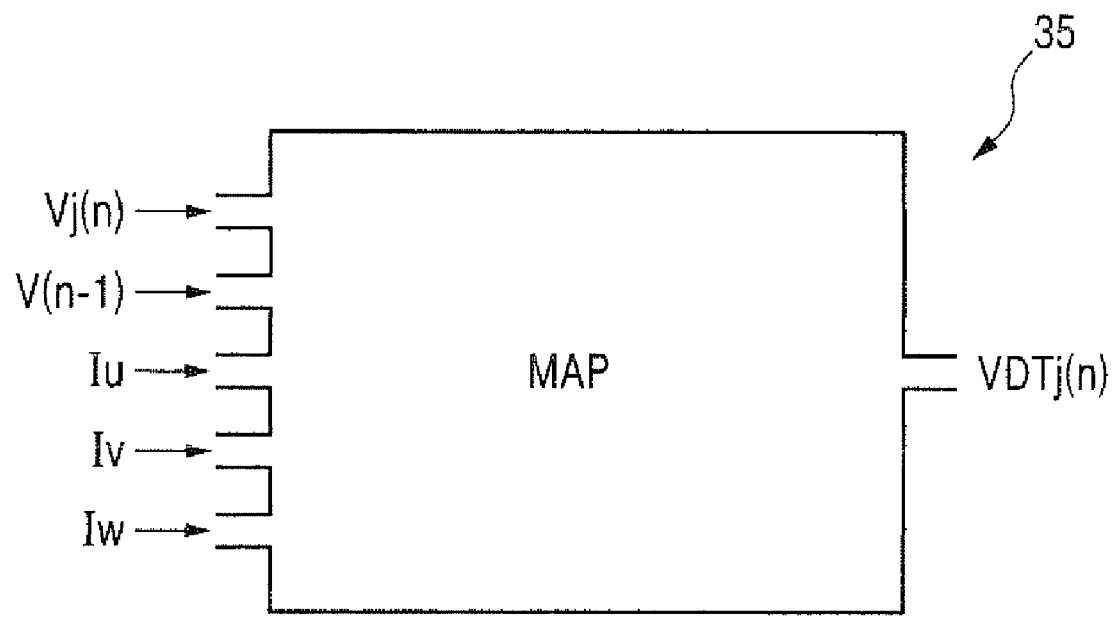
FIG. 5 shows a map used to determine a voltage vector set in the dead time in a compensating unit shown in FIG. 1.

FIG. 5 shows a map used to determine the voltage vector VDT in the unit 35. As shown in FIG. 5, the voltage vector VDT set in the dead time DT is determined from polarities of the detected phase currents Iu, Iv and Iw, the voltage vector V(n−1) determined in the unit 34 to be actually set in the inverter IV in the present control period, and the voltage vector Vj(n) (j=1, 2, - - - , 7) of the selecting unit 31 selected as a candidate for the voltage vector V(n) to be set in the inverter IV in the state setting time of the succeeding control period.

FIG. 6 shows the voltage vector VDT determined in the unit 35 according to polarities of phase current (s) when one of two voltage vectors is changed to the other vector. As shown in FIG. 6, as the first example, when the predicting unit 33 performs the current prediction on condition that one of the voltage vectors V1 and V2 is changed to the other voltage vector (V1↔V2), only the switching elements corresponding to the V-phase perform the switching operation (see FIG. 2A). Therefore, the voltage vector VDT is determined according to the polarity of only the phase current Iv. When the polarity of the phase current Iv is positive such that the V-phase current flows into the generator 10, the voltage vector VDT is determined at V1. In contrast, when the polarity of the phase current Iv is negative such that the V-phase current flows out the generator 10, the voltage vector VDT is determined at V2. As the second example, when the predicting unit 33 performs the current prediction on condition that one of the voltage vectors V1 and V3 is changed to the other voltage vector (V1↔V3), four switching elements corresponding to the U- and V-phases perform the switching operation (see FIG. 2A). Therefore, the voltage vector VDT is determined according to the polarities of the phase currents Iu and Iv. As the third example, when the voltage vector change between V1 and V4 (V1↔V4), between V0 and V7 ↔(V0↔V7), between V2 and V5 (V2↔V5) or between V3 and V6 (V3↔V6), all six switching elements corresponding to the U-, V- and W-phases perform the switching operation (see FIG. 2A), and the voltage vector VDT is determined according to the polarities of the phase currents Iu, Iv and Iw. The voltage vector VDT is, for example, determined at V0 in case of Iu>0, Iv>0 and Iw>0. In contrast, in the case where the voltage vector Vj(n) is the same as the voltage vector V(n−1), no change of the controlled state is performed. Therefore, the voltage vector VDT is determined at V(n−1) (or Vj(n)).

The controlled voltage Vc outputted from the inverter IV is changed with the supply voltage VDC changing with time, so that the norm (i.e., length) of the voltage vector VDT is changed with the supply voltage VDC. In the determination of the voltage vector VDT, the unit 35 outputs the voltage vector VDT having a normalized norm from the map, and the unit 35 changes the norm of the vector VDT according to the supply voltage VDC such that the vector VDT has the norm corresponding to the supply voltage VDC.

Figure 7:
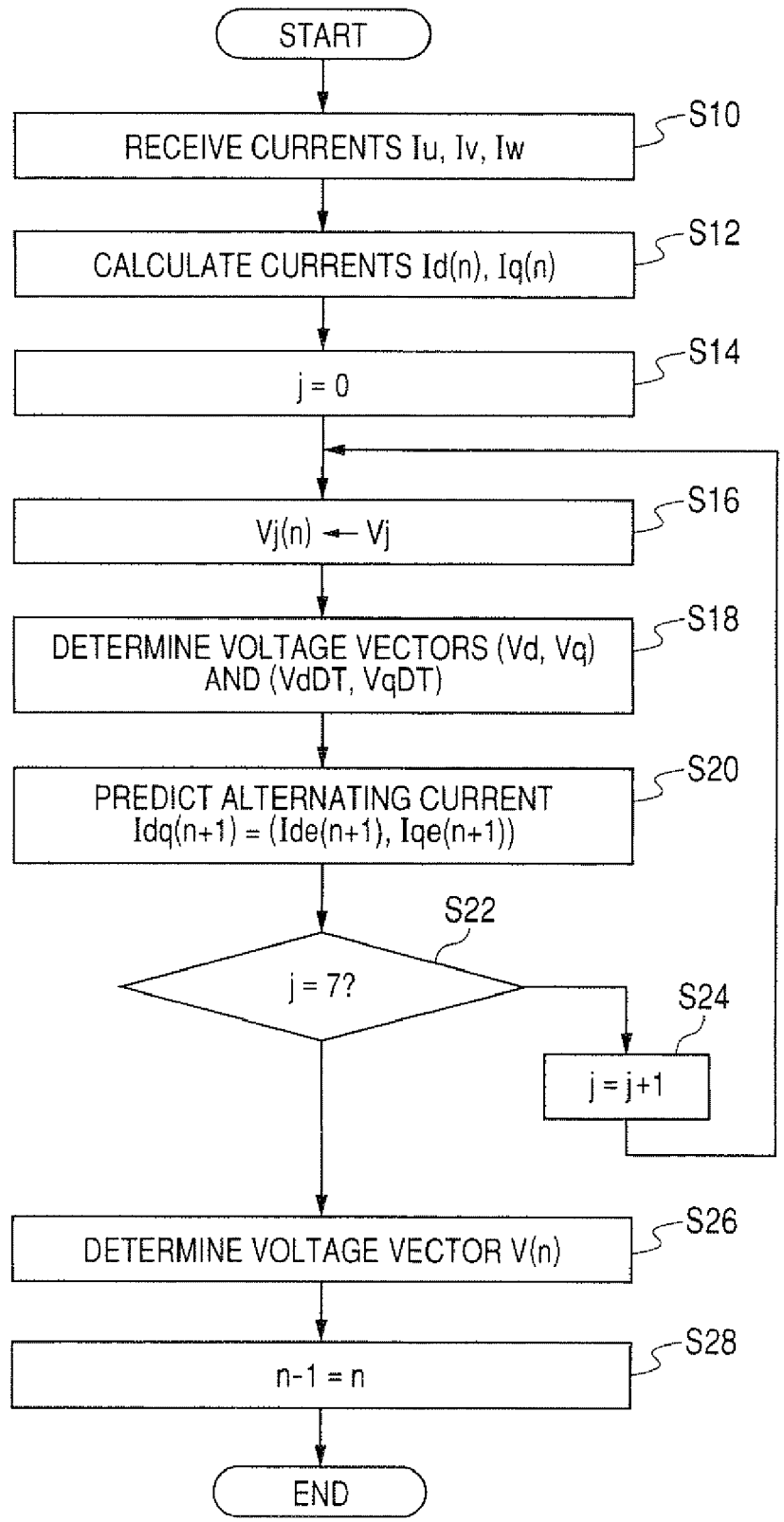
FIG. 7 is a flow chart showing the procedure of the current prediction performed in the control device shown in FIG. 1 according to the model prediction control.

An example of the current prediction and the determination of the controlled state will be described with reference to FIG. 7. FIG. 7 is a flow chart showing the procedure of the current prediction and the determination of the controlled state performed in the control device 20 according to the model prediction control. This current prediction and controlled state determination is performed every control period of time ΔT. The control device 20 controls the inverter IV such that the inverter IV outputs the controlled voltage Vc having the determined voltage vector in the state setting time dt=ΔT−DT of the succeeding control period succeeding the dead time DT.

As shown in FIG. 7, at step S10, each of the units 22 and 35 receives information indicating actual phase currents Iu, Iv and Iw detected in the sensor 16, each of the units 22, 23, 32 and 36 receives the rotational angle θ detected in the sensor 14, each of the units 31 and 35 receives information indicating the supply voltage VDC, and the unit 35 receives the voltage vector V(n−1) determined in the unit 34 in the preceding control period ΔT(n−1) to be set in the inverter IV in the state setting time of the present control period ΔT(n). At step S12, the converting unit 22 calculates the actual currents Id(n) and Iq(n) from the phase currents Iu, Iv and Iw, and the calculating unit 23 calculates the angular speed ω from the rotational angle θ. At step S14, a variable j specifying the voltage vector is set at 0. At step S16, the voltage vector Vj selected in the selecting unit 31 is expressed by the voltage vector Vj(n) which denotes a candidate for the voltage vector V(n) to be actually set in the inverter IV in the succeeding control period. At step S18, the converting unit 32 determines the voltage vector Vj(n)=(Vd, Vq) from the voltage vector Vj(n), and the units 35 and 36 determine the voltage vector VDT=(VdDT, VqDT) from polarities of the phase currents Iu, Iv and Iw, the voltage vectors V(n−1) and Vj(n) and information indicating the supply voltage VDC.

At step S20, the predicting unit 33 predicts an alternating current Idqe(n+1)=(Ide(n+1), Iqe(n+1)) in the present control period, on the assumption that the inverter IV is set in the controlled state corresponding to the voltage vector Vj(n)=(Vd, Vq) in the state setting time dt=ΔT-DT of the succeeding control period, from the actual currents Id(n) and Iq(n), the voltage vectors Vj(n)=(Vd, Vq) and VDT=(VdDT, VqDT) and the angular speed ω according to equations (c5) and (c6).

$$Ide(n+1)=Id(n)+[\Delta T\{-R\times Id(n)+\omega\times Lq\times Iq(n)\}+\{(\Delta T-DT)Vd+DT\times VdDT\}]/Ld \quad (c5)$$

$$Iqe(n+1)=Iq(n)+[\Delta T\{-R\times Iq(n)-\omega\times Ld\times Id(n)-\omega\times\phi\}+\{(\Delta T-DT)Vq+DT\times VqDT\}]/Lq \quad (c6)$$

These equations (c5) and (c6) are obtained by applying the calculus of forward difference for the equations (c3) and (c4) to set discrete variables every control period ΔT.

The predicted current is expected to flow through the generator 10 at a time elapsed by one control period ΔT from the setting of the inverter IV in the controlled state corresponding to the voltage vector Vj(n). The inverter IV is set in the controlled state corresponding to the voltage vector Vj(n) during the period of time dt=ΔT−DT, regardless of whether the voltage vectors V(n−1) and Vj(n) differ from each other.

Then, at step S22, it is judged whether or not the variable j is equal to 7. That is, it is judged whether or not the prediction of the currents Ide(n+1) and Iqe(n+1) for all voltage vectors V0 to V7 has been completed. In the case of a negative judgment at step S20, the procedure proceeds to step S24. At step S24, the variable is incremented by one. Then, at steps S16, S18 and S20, the currents Ide(n+1) and Iqe(n+1) for another voltage vector Vj are predicted.

In contrast, in the case of an affirmative judgment at step S22, the prediction of eight current vectors Idqe=(Ide(n+1), Iqe(n+1)) corresponding to all voltage vectors V0 to V7 has been completed. Therefore, at step S26, the unit 34 determines the voltage vector, minimizing the predicting function J among the voltage vectors V0(n) to V7(n), as the voltage vector V(n) such that the inverter IV outputs the controlled voltage Vc having the voltage vector V(n) during the state setting time dt=ΔT−DT. This state setting time starts after the dead time DT. More specifically, the differential vector Edq= (Idr−Ide(n+1), Iqr−Iqe(n+1)) between the instructed current vector Idqr=(Idr, Iqr) of the setting unit 24 and each predicted current vector Idqe=(Ide(n+1), Iqe(n+1)) is calculated, and the squared magnitude edq$^2$=(Idr−Ide(n+1))$^2$+(Iqr−Iqe(n+1))$^2$ of the differential vector is calculated as the value of the predicting function J (edq). The voltage vector Vi (i= 0, 1, 2, - - - or 7) corresponding to one predicting function having the lowest value among eight values of the predicting functions J(edq) is determined as the voltage vector V(n).

Therefore, the control section 26 produces the control signals Sgup, Sgun, Sgvp, Sgvn, Sgwp and Sgwn according to the determined voltage vector V(n) and controls the inverter IV according to the control signals such that the inverter IV outputs the controlled voltage Vc having the voltage vector VDT in the dead time DT of the succeeding period and outputs the controlled voltage Vc having the determined voltage vector V(n) in the state setting time dt=ΔT−DT.

Then, at step S28, the number n is decremented to n−1 to prepare the determination of the voltage vector in the next control period. For example, the voltage vector V(n) is set as a voltage vector V(n−1), and this vector V(n−1) is stored in a memory (not shown).

As described above, in this embodiment, each time the voltage vector Vj(n) selected in the selecting unit 31 differs from the voltage vector V(n−1) which has been already determined in the unit 34 in the preceding control period to be outputted from the inverter IV in the present control period, the compensating unit 35 judges the polarities of the phase currents flowing through the generator 10 at the present time. The predicting unit 33 predicts the current, expected to flow through the generator 10 at a time elapsed by one control period from the setting time of the selected voltage vector Vj(n) in the inverter IV, from the information indicating each of the selected voltage vectors Vj(n), while performing the prediction based on the judged current polarities when the voltage vector Vj(n) differs from the voltage vector V(n−1). The state determining unit 34 determines one voltage vector from the predicted currents corresponding to the voltage vectors indicated by the information. The control section 26 controls the inverter IV to change the voltage vector V(n−1) of the controlled voltage Vc, already outputted from the inverter IV in the present control period, to the voltage vector determined by the unit 34 and set in the preceding control period.

With this structure of the control device 20, when the controlled state (i.e., voltage vector Vj(n)) indicated by the information differs from the control led state (i.e., voltage vector V(n−1)) of the inverter IV determined by the unit 34 to be set in the state setting time of the present control period, the polarities of the phase currents flowing through the generator 10 influence the controlled state set in the transfer time succeeding the state setting time of the present control period. In this case, the controlled state actually set in the transfer time is sometimes differentiated from the controlled state determined by the unit 34 to be set in the inverter IV in the succeeding control period, so that it is difficult to predict the current with high precision.

However, in this embodiment, each time the controlled state indicated by the information differs from the controlled state of the inverter IV set in the present control period, the predicting unit 33 performs the prediction based on the polarities of the currents.

Accordingly, the control device can predict the current flowing through the generator 10 with high precision by using the model prediction control.

Further, in this embodiment, when the controlled state indicated by the information differs from the controlled state set in the present control period, the compensating unit 35 determines one of the voltage vectors as the dead time voltage vector VDT of the controlled voltage Vc, outputted from the inverter IV in the transfer time, from the current polarities. The predicting unit 33 predicts the current flowing through the generator 10 from the information indicating the voltage vector Vj(n) and the voltage vector VDT.

Therefore, the difference between the voltage vector VDT in the transfer time and the voltage vector corresponding to the controlled state set in the preceding control period can be clearly indicated. Accordingly, the control device can predict the current with higher precision.

Second Embodiment

In this embodiment, the compensating unit 35 determines the voltage vector VDT set in the dead time DT according to specific control logic without using the map shown in FIG. 5.

Figure 8:
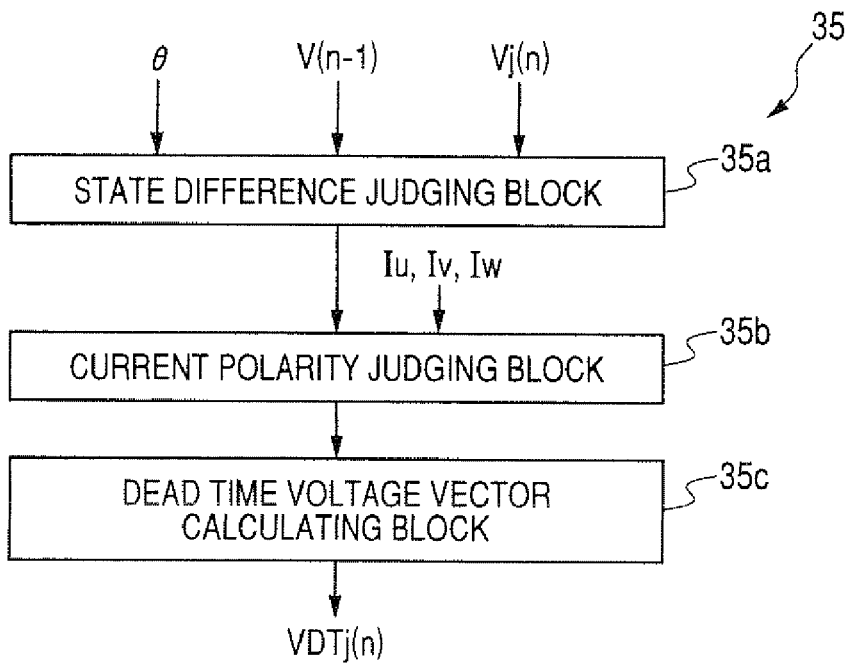
FIG. 8 is a block diagram of a compensating unit shown in FIG. 1 according to the second embodiment of the present invention.

FIG. 8 is a block diagram of the compensating unit 35 according to the second embodiment.

Figure 9:
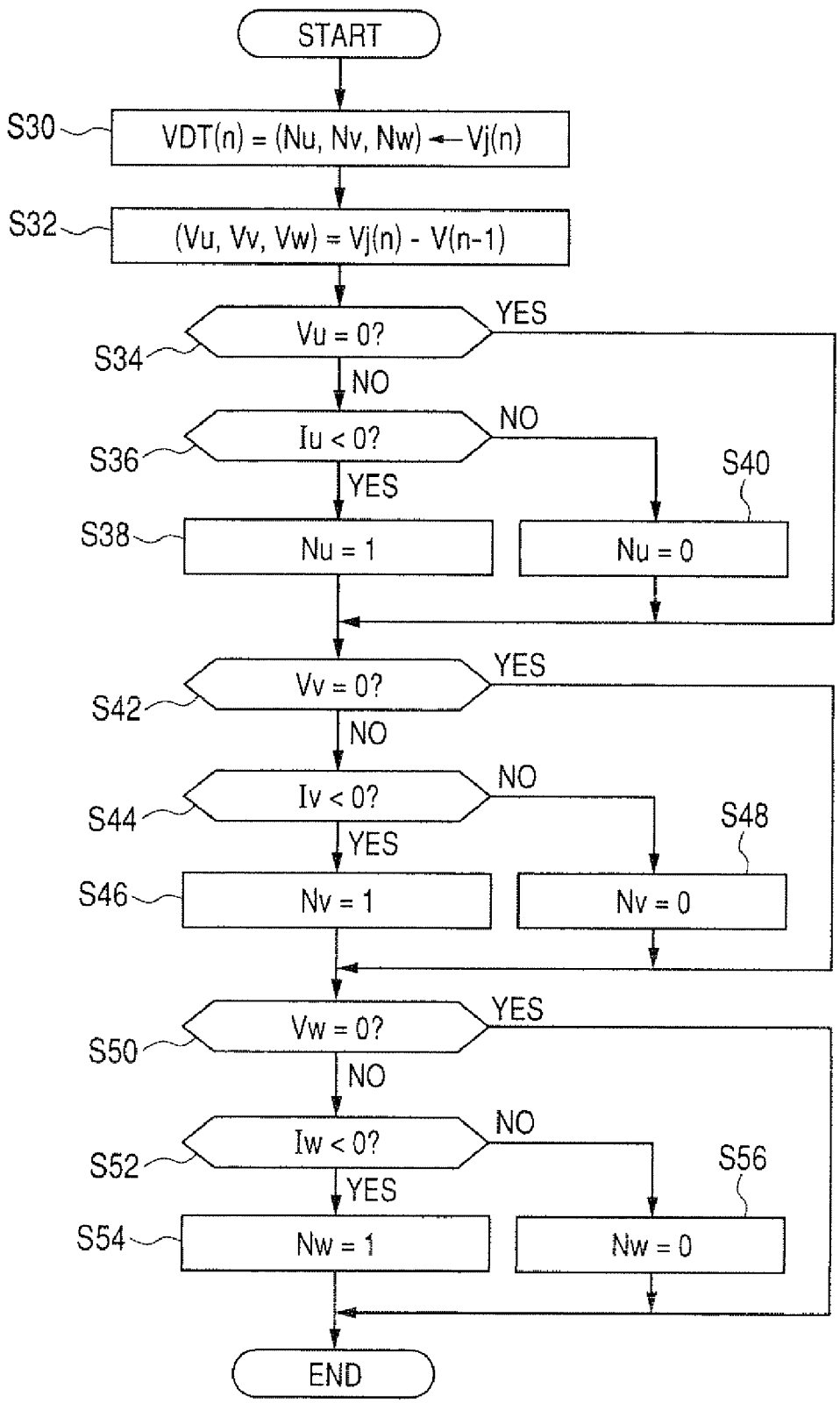
FIG. 9 is a flow chart showing the control logic for determining a voltage vector set in a dead time in the compensating unit according to the second embodiment.

As shown in FIG. 8, the compensating unit 35 has a state difference judging block 35a that judges whether or not each voltage component of the voltage vector Vj(n) selected in the selecting unit 31 differs from the corresponding voltage component of the voltage vector V(n−1), determined in the unit 34 in the preceding control period so as to be set in the inverter IV in the state setting time of the present control period, a current polarity judging block 35b that judges a polarity of each phase current, flowing through the generator 10 at the present time, from the flow direction of the current, and a dead time voltage vector calculating block (i.e., an intermediate voltage vector calculating block) 35c that calculates each voltage component of the voltage vector VDTj(n), to be set in the dead time DT succeeding the state setting time of the present control period, according to the judging results of the corresponding voltage component obtained in the blocks 35a and 35b. FIG. 9 is a flowchart showing the control logic for determining the voltage vector VDT of the dead time DT in the unit 35 according to the second embodiment. This processing shown in FIG. 9 is performed at the start of each control period ΔT.

As shown in FIG. 7, at step S30, the voltage vector VDTj(n) of the controlled voltage Vc to be set in the dead time DT of the succeeding control period is initially set at the voltage vector Vj(n) on the assumption that the voltage vector Vj(n) is the same as the voltage vector V(n−1). The vector VDTj(n) has voltage components (Nu, Nv, Nw). The U-, V- or W-phase voltage component Nu, Nv or Nw set at 1 denotes that the switching element ESup, ESvp or ESwp of the corresponding phase on the higher voltage side is set in the on state. The U-, V- or W-phase voltage component Nu, Nv or Nw set at 0 denotes that the switching element ESun, ESvn or ESwn of the corresponding phase on the lower voltage side is set in the on state. Further, in this control logic, components in each of the vectors V(n−1) and Vj(n) are indicated in the same manner as the components of the vector VDT.

At step S32, the differential vector (Vu, Vv, Vw) is calculated by subtracting the vector V(n−1) from the vector Vj(n). This differential vector indicates the change from the vector V(n−1) to the vector Vj(n).

At step S34, to judge whether or not states of the U-phase switching elements are changed in the succeeding control period, the block 35a judges whether or not the U-phase voltage component Vu is equal to 0. In the case of a negative judgment at step S34, the block 35a judges that states of the U-phase switching elements are changed in the succeeding control period. Therefore, at step S36, to judge the polarity of the phase current Iu flowing through the U-phase winding of the generator 10, the block 35b judges whether or not the phase current Iu is negative.

In the case of an affirmative judgment at step S36, because the phase current Iu flows out the generator 10, the block 35b judges that the polarity of the phase current Iu is negative. Therefore, at step S38, the block 35c sets the U-phase component Nu of the vector VDTj(n) at 1 to indicate that the switching element ESup is substantially set at the on state in the dead time DT (see FIG. 4). In contrast, in the case of a negative judgment at step S36, because the phase current Iu flows into the generator 10, the block 35b judges that the polarity of the phase current Iu is positive. Therefore, at step S40, the block 35c sets the U-phase voltage component Nu of the vector VDTj(n) at 0 to indicate that the switching element ESun is substantially set at the on state in the dead time DT (see FIG. 4).

After step S38 or S40 or in the case of an affirmative judgment at step S34, to check the change in the V-phase switching elements, at step S42, the block 35a judges whether or not the V-phase voltage component Vv is equal to 0. In the case of a negative judgment at step S42, the block 35a judges that states of the V-phase switching elements are changed in the succeeding control period. Therefore, at step S44, the block 35b judges whether or not the phase current Iv flowing through the V-phase winding of the generator 10 is negative.

In the case of an affirmative judgment at step S44, because the phase current Iv flows out the generator 10, the block 35b judges that the polarity of the phase current Iv is negative. Therefore, at step S46, the block 35c sets the V-phase component Nv of the vector VDTj(n) at 1 to indicate that the switching element ESvp is substantially set at the on state in the dead time DT (see FIG. 4). In contrast, in the case of a negative judgment at step S44, because the phase current Iv flows into the generator 10, the block 35b judges that the polarity of the phase current Iv is positive. Therefore, at step S48, the block 35c sets the V-phase voltage component Nv at 0 to indicate that the switching element ESvn is substantially set at the on state in the dead time DT (see FIG. 4).

After step S46 or S48 or in the case of an affirmative judgment at step S42, to check the change in the W-phase switching elements, at step S50, the block 35a judges whether or not the W-phase voltage component Vw is equal to 0. In the case of a negative judgment at step S50, the block 35a judges that states of the W-phase switching elements are changed in the succeeding control period. Therefore, at step S52, the block 35b judges whether or not the phase current Iw flowing through the W-phase winding of the generator 10 is negative.

In the case of an affirmative judgment at step S52, because the phase current Iw flows out the generator 10, the block 35b judges that the polarity of the phase current Iw is negative. Therefore, at step S54, the block 35c sets the W-phase component Nw of the vector VDTj(n) at 1 to indicate that the switching element ESwp is substantially set at the on state in the dead time DT (see FIG. 4). In contrast, in the case of a negative judgment at step S52, because the phase current Iw flows into the generator 10, the block 35b judges that the polarity of the phase current Iw is positive. Therefore, at step S56, the block 35c sets the W-phase voltage component Nw at 0 to indicate that the switching element ESwn is substantially set at the on state in the dead time DT (see FIG. 4).

Therefore, when the component of the voltage vector Vj(n) is the same as that of the voltage vector V(n−1), the block 35c sets the corresponding component of the voltage vector VDT to be the same as that of the voltage vector Vj(n). When the component of the voltage vector Vj(n) differs from that of the voltage vector V(n−1) while the polarity of the corresponding phase current is negative, the block 35c sets the corresponding component of the voltage vector VDT such that the corresponding switching element of the higher voltage side is set in the on state during the dead time DT. When the component of the voltage vector Vj(n) differs from that of the voltage vector V(n−1) while the polarity of the corresponding phase current is positive, the block 35c sets the corresponding component of the voltage vector VDT such that the corresponding switching element of the lower voltage side is set in the on state during the dead time DT.

Accordingly, the compensating unit 35 can reliably judge whether or not states of two switching elements of each of the U-, V- and W-phases are changed in the succeeding control period. Further, when states of two switching elements of at least one phase are changed, the unit 35 can appropriately set the corresponding phase component of the voltage vector VDT according to the polarity of the corresponding phase current.

Further, because the unit 35 determines the voltage vector VDT set in the dead time DT without using the map shown in FIG. 5, the compensating unit 35 can be appropriately structured while reducing the storage capacity of a memory required of the control device 20.

Figure 10:
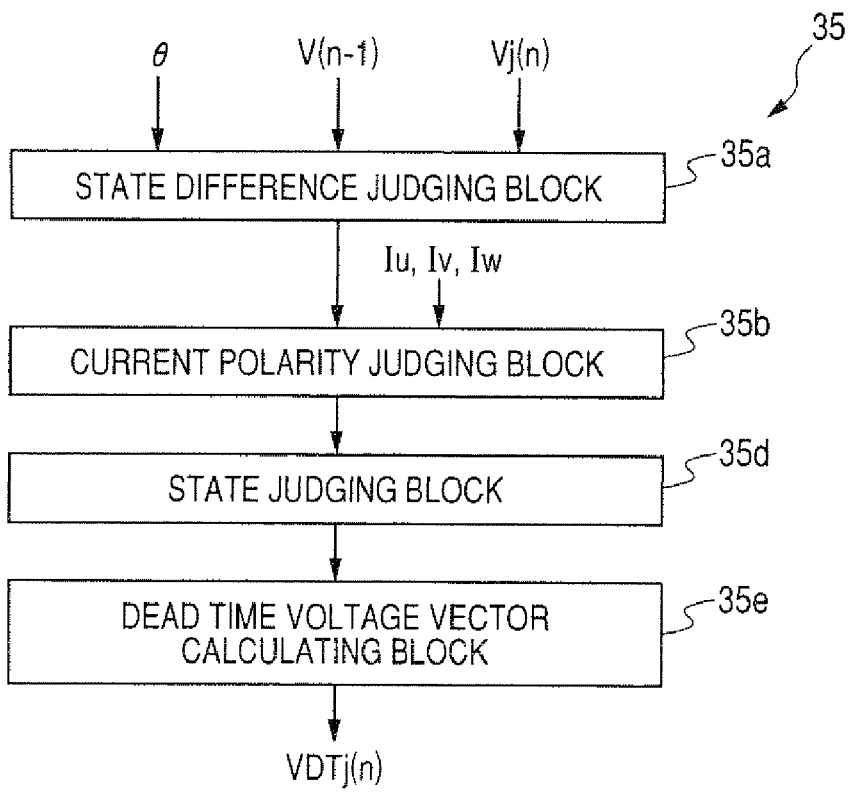
FIG. 10 is a block diagram of a compensating unit shown in FIG. 1 according to one modification of the second embodiment.

This embodiment is not limited to the control logic performed in the blocks 35a to 35c. For example, as shown in FIG. 10, the compensating unit 35 may have the blocks 35a and 35b, a state judging block 35d that judges whether or not each voltage component of the voltage vector Vj(n) indicates that the switching element of the higher voltage side corresponding to each phase is set in the on state in the succeeding control period, and a dead time voltage vector calculating block (i.e., an intermediate voltage vector calculating block) 35e that calculates each voltage component of the voltage vector VDTj(n) from the judging results of the corresponding voltage component obtained in the blocks 35a, 35b and 35d. In the case where the polarity of the phase current is positive, when the component of the voltage vector Vj(n) indicates that the switching element of the higher voltage side is set in the on state while the component of the voltage vector Vj(n) differs from the component of the voltage vector V(n−1), the component of the voltage vector VDTj(n) is differentiated from the component of the voltage vector Vj(n). In the case where the polarity of the phase current is negative, when the component of the voltage vector Vj(n) indicates that the switching element of the lower voltage side is set in the on state while the component of the voltage vector Vj(n) differs from the component of the voltage vector V(n−1), the component of the voltage vector VDTj(n) is differentiated from the component of the voltage vector Vj(n).

Third Embodiment

Figure 11:
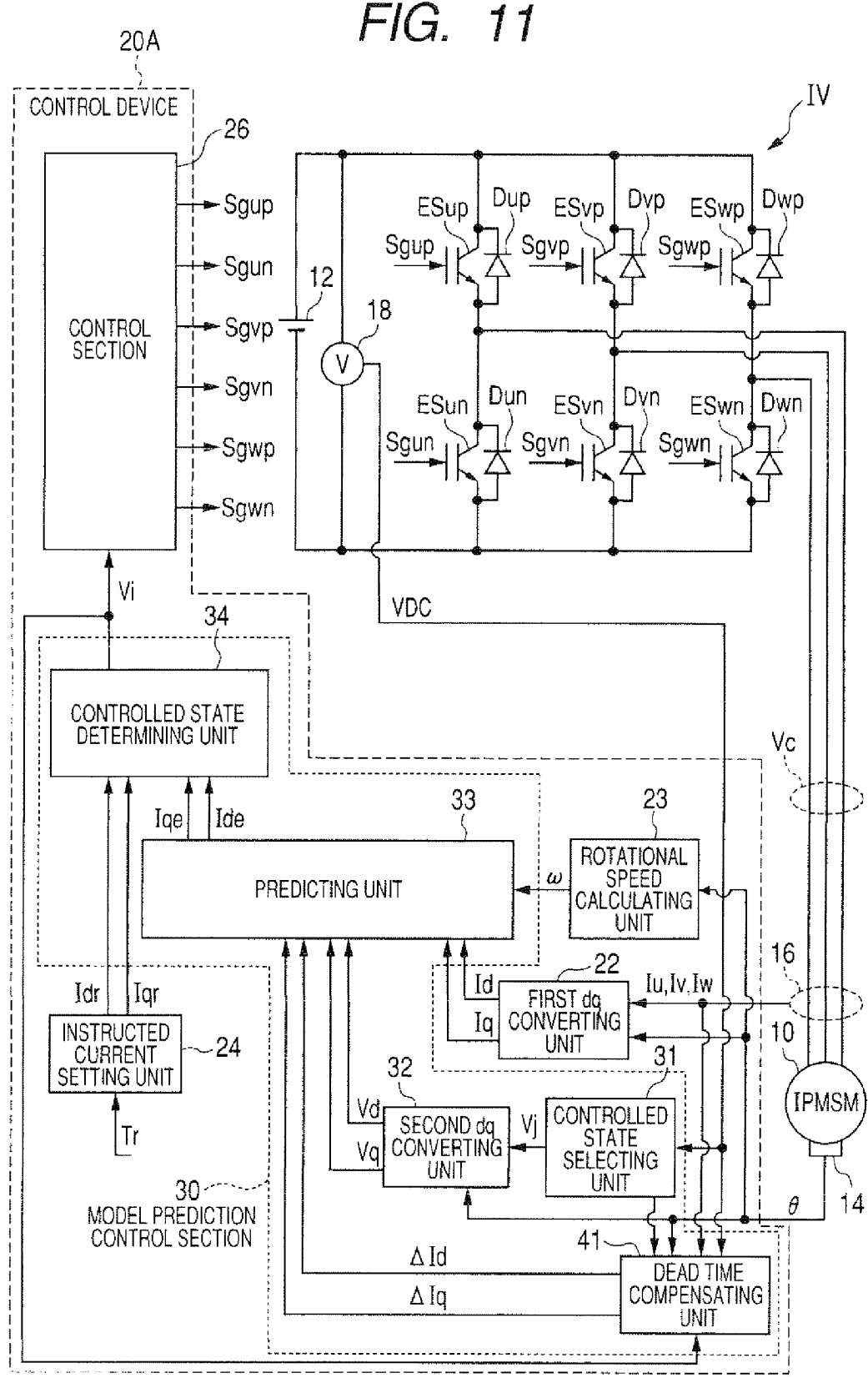
FIG. 11 is a view showing the structure of a control system having a control device according to the third embodiment of the present invention.

FIG. 11 is a view showing the structure of a control system having a control device according to the third embodiment.

As shown in FIG. 11, a control device 20A according to this embodiment differs from the control device 20 shown in FIG. 1 in that the device 20A has a dead time compensating unit (i.e., a polarity judging unit) 41 in place of the units 35 and 36.

On the assumption that there is no period of the dead time DT in the control period ΔT, the predicting unit 33 predicts a base value Idbe(n+1) of the d-axis current Ide(n+1) and a base value Iqbe(n+1) of the q-axis current Iqe(n+1) according to equations (c7) and (c8).

$$Idbe(n+1)=Id(n)+[\Delta T\{-RId(n)+\omega LqIq(n)\}+\Delta TVd]/Ld \quad (c7)$$

$$Iqbe(n+1)=Iq(n)+[\Delta T\{-RIq(n)-\omega LdId(n)-\omega\phi\}+\Delta TVq]/Lq \quad (c8)$$

These equations (c7) and (c8) are obtained by setting the dead time DT at zero in the respective equations (c5) and (c6).

To compensate for the difference between the controlled state (i.e., the voltage vector) determined in the unit 34 and the controlled state substantially set in the inverter IV in the dead time DT in response to the determination of the unit 34, the compensating unit 41 judges polarities of the phase currents Iu, Iv and Iw detected in the sensor 16. Then, when the voltage vector Vj(n) selected in the selecting unit 31 differs from the voltage vector V(n−1) determined in the unit 34 in the preceding control period so as to be actually set in the inverter IV in the present control period, the compensating unit 41 calculates the dead time voltage vector VDT=(VdDT, VqDT) while using the judged polarities, the voltage vectors V(n−1) and Vj(n), information indicating the supply voltage VDC detected in the sensor 18 and information indicating the rotational angle θ. Then, the compensating unit 41 calculates a d-axis correction value ΔId and a q-axis correction value ΔIq according to equations (c9) and (c10), from voltage components VdDT and VqDT of the voltage vector VDT.

$$\Delta Id=(-DT\times Vd+DT\times VdDT)/Ld \quad (c9)$$

$$\Delta Iq=(-DT\times Vq+DT\times VqDT)/Lq \quad (c10)$$

The predicting unit (i.e., predicting block) 33 predicts the sum of the base value Idbe(n+1) and the d-axis correction value ΔId as the d-axis current Ide(n+1) and predicts the sum of the base value Iqbe(n+1) and the q-axis correction value ΔIq as the q-axis current Iqe(n+1). The currents Ide(n+1) and Iqe(n+1) predicted according to the third embodiment coincide with the currents Ide(n+1) and Iqe(n+1) predicted according to the first embodiment.

Accordingly, even when the voltage vector V(n) to be set in the succeeding control period differs from the voltage vector V(n−1) actually set in the present control period, the error caused in the predicted current due to the dead time producing process of the control section 26 can be reliably suppressed.

Fourth Embodiment

Figure 12:
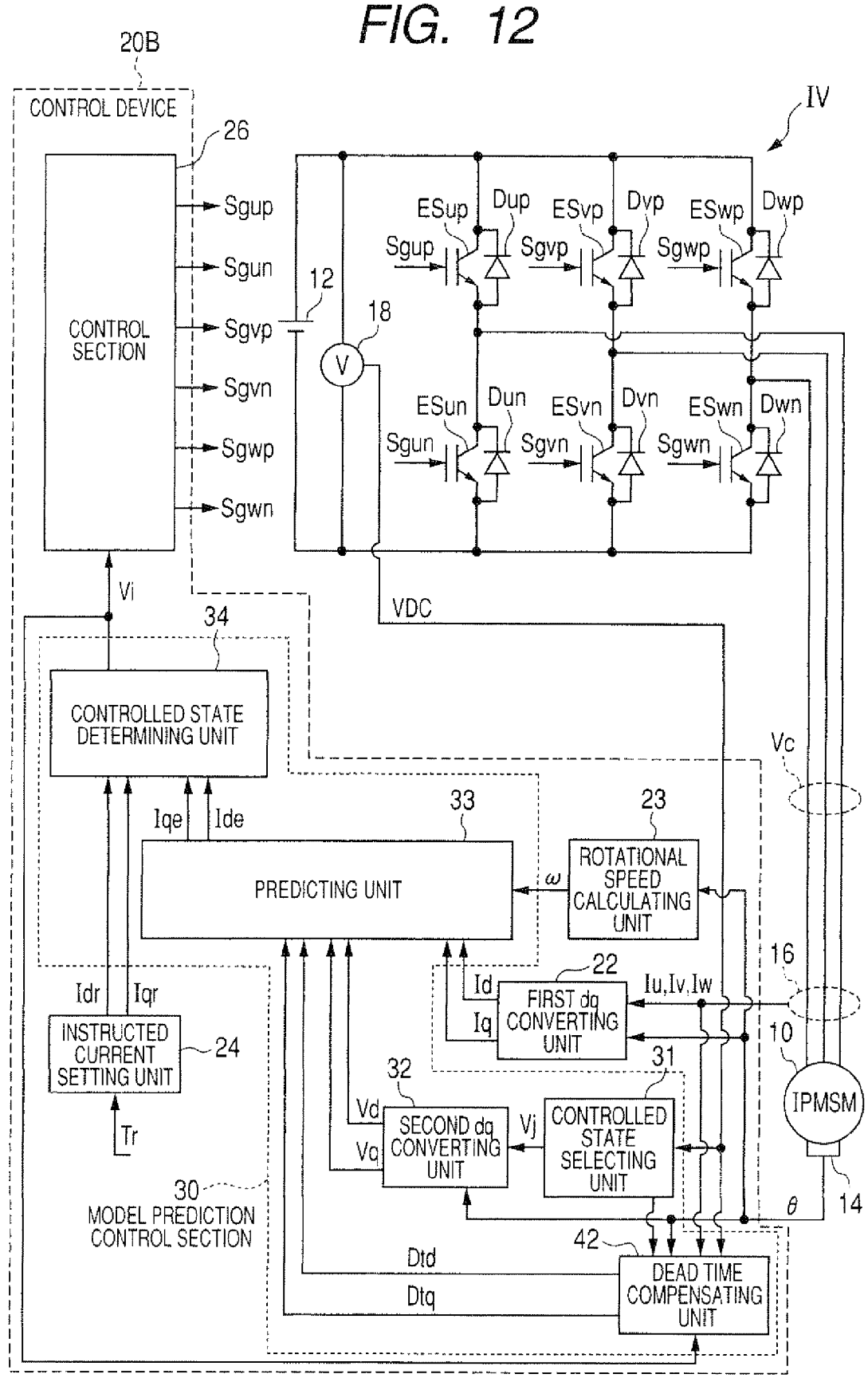
FIG. 12 is a view showing the structure of a control system having a control device according to the fourth embodiment of the present invention.

FIG. 12 is a view showing the structure of a control system having a control device according to the fourth embodiment. As shown in FIG. 12, a control device 20B according to this embodiment differs from the control device 20 shown in FIG. 1 in that the device 20B has a dead time compensating unit (i.e., a voltage applying time calculating unit) 42 in place of the units 35 and 36.

On the assumption that the d-axis voltage Vd is constantly applied to the generator 10 during a d-axis voltage applying time Dtd while the q-axis voltage Vq is constantly applied to the generator 10 during a q-axis voltage applying time Dtq, the predicting unit (i.e., base value predicting unit) 33 predicts the d-axis current Ide(n+1) and the q-axis current Iqe(n+1) according to equations (c11) and (c12).

$$Ide(n+1)=Id(n)+[\Delta T\{-RId(n)+\omega LqIq(n)\}+DtdVd]/Ld \quad (c11)$$

$$Iqe(n+1)=Iq(n)+[\Delta T\{-RIq(n)-\omega LdId(n)-\omega\phi\}+DtqVq]/Lq \quad (c12)$$

The voltage applying times Dtd and Dtq are expressed as follows.

$$Dtd=\{(\Delta T-DT)\times Vd+DT\times VdDT\}/Vd \quad (c13)$$

$$Dtq=\{(\Delta T-DT)\times Vq+DT\times VqDT\}/Vd \quad (c13)$$

Therefore, the currents Ide(n+1) and Iqe(n+1) predicted according to the fourth embodiment coincide with the currents Ide(n+1) and Iqe(n+1) predicted according to the first embodiment.

Prior to the prediction of the predicting unit 33, the compensating unit 42 judges polarities of the phase currents Iu, Iv and Iw detected in the sensor 16, calculates the dead time voltage vector VDT=(VdDT, VqDT), when the voltage vector Vj(n) selected in the selecting unit 31 differs from the voltage vector V(n−1) determined in the unit 34 in the preceding control period to be actually set in the inverter IV in the present control period, from the judged polarities, the voltage vectors V(n−1) and Vj(n), information indicating the supply voltage VDC detected in the sensor 18 and information indicating the rotational angle θ, and calculates the voltage applying times Dtd and Dtq, from voltage components VdDT and VqDT of the voltage vector VDT. The prediction of the predicting unit 33 is performed by using the voltage applying times Dtd and Dtq calculated in the unit 42.

Therefore, when the voltage vector V(n) to be set in the succeeding control period differs from the voltage vector V(n−1) actually set in the present control period, the control period ΔT, in which the controlled voltage Vc is applied to the generator 10, is corrected to the voltage applying times Dtd and Dtq.

Accordingly, even when the voltage vector V(n) differs from the voltage vector V(n−1), the error caused in the predicted current due to the dead time producing process of the control section 26 can be appropriately suppressed.

Fifth Embodiment

In this embodiment, a torque actually generated in the generator 10 and a magnetic flux actually induced in the generator 10 are set as controlled variables of the generator 10 directly controlled by a control device, and the predicted torque and the predicted magnetic flux are calculated from the predicted current. The control device controls the generator 10 such that the predicted torque and the predicted magnetic flux approach instructed values of the torque and magnetic flux.

Figure 13:
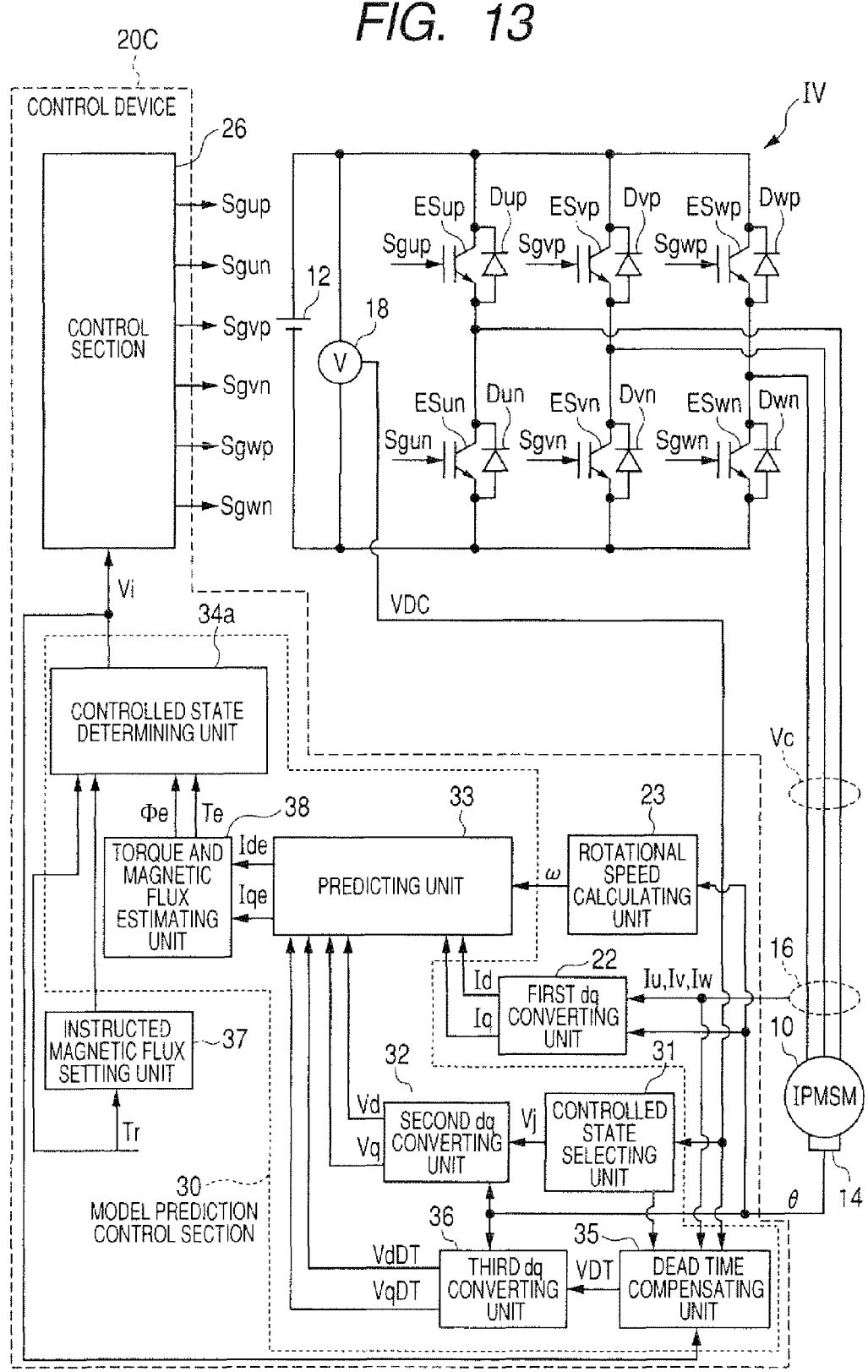
FIG. 13 is a view showing the structure of a control system having a control device according to the fifth embodiment of the present invention.

FIG. 13 is a view showing the structure of a control system having a control device according to the fifth embodiment. As shown in FIG. 13, a control device 20C differs from the device 20 shown in FIG. 1 in that the device 20C has an instructed magnetic flux setting unit 37, a torque and magnetic flux predicting unit 38 and a controlled state determining unit 34a, in place of the units 24 and 34 of the device 20.

The unit 38 predicts a magnetic flux vector Φe=(Φde, Φqe) defined on the dq rotational coordinate system and a torque Te from the predicted currents Ide and Iqe of the predicting unit 33 according to the following equations:

$$\Phi d=Ld\cdot Id+\phi \quad (c15)$$

$$\Phi q=Lq\cdot Iq \quad (c16)$$

$$T=P(\Phi d\cdot Iq-\Phi q\cdot Id) \quad (c17)$$

where the parameter P denotes the number of pole pairs. In this prediction, by setting variables Id and Iq at the predicted currents Ide and Iqe, the variables Φd, Φq and T are calculated as the predicted magnetic flux components Φde and Φqe and the predicted torque Te.

The unit 37 has a magnetic flux map indicating the relation between a torque and a magnetic flux vector. The unit 37 receives the target torque Tr and sets an instructed magnetic flux vector Φr=(Φdr, Φqr) corresponding to the target torque Tr according to the relation of the map. The vector Φr is set so as to satisfy the requirement of the maximum torque control and the like. In this maximum torque control, the maximum torque is generated in the generator 10 from the minimum current.

The unit 34a calculates a value of a predicting function J from the predicted magnetic flux vector Φe, the predicted torque Te, the instructed magnetic flux vector Φr and the target torque Tr each time the selecting unit 31 selects one voltage vector. Then, the unit 34a determines one controlled state corresponding to the value of the function J, indicating the highest level of prediction, as a controlled state (i.e. voltage vector V(n)) of the inverter Iv to be actually set in the succeeding control period. More specifically, the torque difference ET=Tr−Te between the torques Tr and Te and the magnetic flux difference EΦ=Φr−Φe between the flux vectors Φe and Φr are calculated, and the value of the function J(ET, EΦ) is indicated by the sum $ET^2+E\Phi^2$ of the squared torque difference $ET^2$ and the squared magnetic flux difference $E\Phi^2$. The unit 34a determines the controlled state of the inverter IV corresponding to the minimum value of the function J among the values of the function J.

Accordingly, even when the control device 20C predicts the current different from the direct controlled variable (i.e., torque and magnetic flux) of the generator 10, the device 20C can control the controlled variable of the generator 10, in the same manner as in the first embodiment.

Sixth Embodiment

In the first to fifth embodiments, the control device detects the phase currents flowing though the generator 10, and the current predicted according to the model prediction control is corrected on the basis of polarities of the phase currents to compensate the error caused in the predicted current due to the dead time producing process of the control section 26. In contrast, in the sixth embodiment, to compensate this error without detecting the polarities of the phase currents, the voltage actually applied to the generator 10 is detected, and the current predicted according to the model prediction control is corrected on the basis of the difference between the controlled voltage Vc determined in the unit 34 and the actual voltage.

Figure 14:
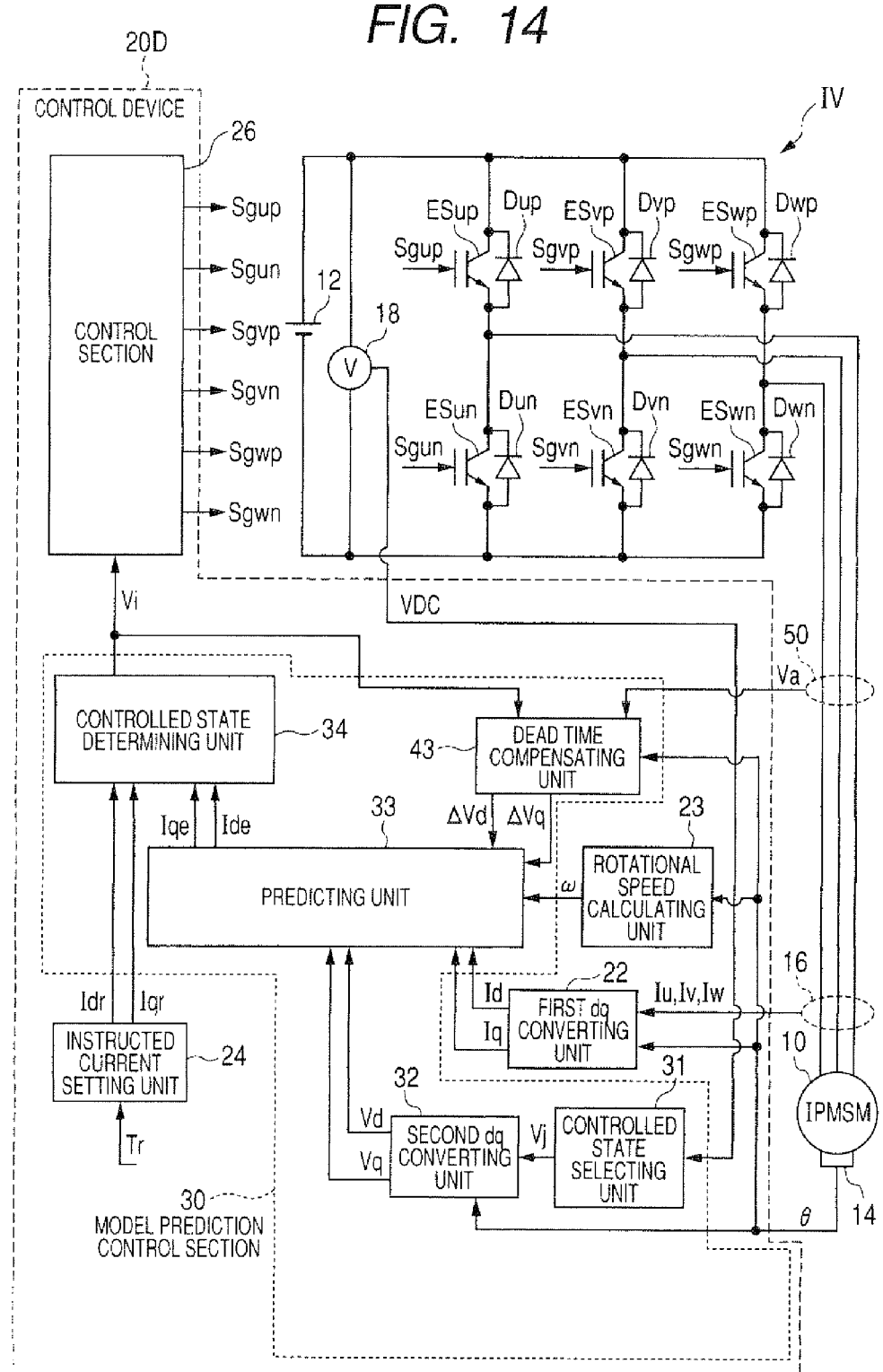
FIG. 14 is a view showing the structure of a control system having a control device according to the sixth embodiment of the present invention.

FIG. 14 is a view showing the structure of a control system having a control device according to the sixth embodiment. As shown in FIG. 14, a control device 20D differs from the device 20 shown in FIG. 1 in that the device 20D has a dead time compensating unit 43 in place of the unit 35 of the device 20. Further, a voltage sensor 50 detects the voltage actually applied to the windings of the generator 10.

The compensating unit 43 receives the voltage Va actually applied to the generator 10 in the present control period from the sensor 50 and receives the voltage vector Vi=(Vd, Vq) of the controlled voltage Vc which is determined in the unit 34 in the preceding control period to be applied to the generator 10 in the present control period. Then, the unit 43 calculates the actual voltage Va=(Vda, Vqa), defined on the dq rotational coordinate system, from the received voltage Va by using the rotational angle θ of the sensor 14 and calculates a d-axis voltage difference ΔVd=Vda−Vd and a q-axis voltage difference ΔVq=Vqa−Vq from the difference between the actual voltage Va and the controlled voltage Vc=(Vd, Vq) determined in the unit 34.

The predicting unit 33 corrects the d-axis voltage Vd and the q-axis voltage Vq selected and calculated in the units 31 and 32 according to the respective differences ΔVd and ΔVq to obtain a d-axis corrected voltage Vdc and a q-axis corrected voltage Vqc. Then, each time the selecting unit 31 selects one controlled state, the predicting unit 33 predicts the currents Ide(n+1) and Iqe(n+1) according to the following equations.

$$Ide(n+1)=Id(n)+[\Delta T\{-RId(n)+\omega LqIq(n)\}+\Delta TVdc]/Ld \quad (c18)$$

$$Iqe(n+1)=Iq(n)+[\Delta T\{-RIq(n)-\omega LdId(n)-\omega\phi\}+\Delta TVqc]/Lq \quad (c19)$$

The predicting unit 33 performs the correction such that the controlled voltage having the voltage vector Vi determined in the unit 34 approaches the actual voltage Va of the generator 10. More specifically, when the actual voltage Vda or Vqa is lower than the controlled voltage having the determined voltage vector Vi, the predicting unit 33 sets a correction value according to the difference ΔVd or ΔVq such that the corrected voltage Vdc or Vqc becomes lower than the controlled voltage component Vd or Vq of the voltage vector Vj, selected and calculated in the units 31 and 32, by the correction value. Therefore, the predicting unit 33 can predict the current such that the voltage vector (Vd, Vq) of the controlled voltage Vc determined in the unit 34 approaches the actual voltage Va detected from the generator 10.

The determining unit 34 determines one voltage vector from the currents Ide(n+1) and Iqe(n+1), corresponding to the eight voltage vectors selected in the selecting unit 31, in the present control period, and the control section 26 controls the inverter IV in the succeeding control period according to the control signals produced from the determined voltage vector. That is, the control device 20D performs not only the model prediction control but also the feed-back control based on the detected voltage to control the generator 10.

The difference between the actual voltage Va and the controlled voltage Vc=(Vd, Vq) determined in the unit 34 is caused due to the dead time producing process of the control section 26, so that the differences ΔVd and ΔVq, respectively, depend on the voltage components VdDT and VqDT. The predicting unit 33 sets the corrected voltages Vdc=Vd+DT(VdDT−Vd)/ΔT and Vqc=Vq+DT(VqDT−Vq)/ΔT on the basis of the respective differences ΔVd and ΔVq depending on the voltage components VdDT and VqDT. In this case, the currents Ide(n+1) and Iqe(n+1) predicted according to the sixth embodiment coincide with the currents Ide(n+1) and Iqe(n+1) predicted according to the first embodiment.

Accordingly, because the control device 20D performs not only the model prediction control but also the feed-back control based on the detected voltage to control the generator 10, the device 20D can appropriately predict the current flowing through the generator 10 with high precision while compensating the error caused in the predicted current due to the dead time producing process of the control section 26. That is, the device 20D can appropriately predict the current such that the voltage vector (Vd, Vq) of the controlled voltage Vc determined in the unit 34 approaches the actual voltage Va detected from the generator 10 according to the feed-back control.

Modifications

In each embodiment, the controlled variable (e.g., current or magnetic flux) is predicted for each of all voltage vectors V0 to V7. However, controlled variables may be predicted for each of the non-zero vectors V1 to V6 and one zero vector V0 or V7.

Further, in each embodiment, the predicting function J is indicated only by the difference between the predicted controlled variable and the instructed controlled variable. However, the predicting function J may be additionally indicated by the number of switching elements of which the on or off states set in the present control period are changed to the other states in the succeeding control period.

Moreover, in each embodiment, the control variable (e.g., the current or the magnetic flux) expected at a time elapsed by one control period from the setting of the controlled state of the inverter IV is predicted on the assumption that the inverter IV is set in the controlled state in the succeeding control period. However, control variables expected in several control periods subsequent to the succeeding control period may be predicted one after another to determine the controlled state of the inverter IV set in the succeeding control period. In this case, it is preferred that the control device predict the current, expected to flow through the generator 10 in each of predicted control periods subsequent to the control period corresponding to the first predicted current, according to the polarity of the current predicted according to the model prediction control.

Furthermore, in each embodiment, the dead time DT is started from the top of each control period. However, the dead time DT may follow the state setting time in each control period to be ended with the control period. When the controlled state of the inverter IV in the succeeding control period is determined from predicted controlled variables expected to appear in several control periods subsequent to the succeeding control period, the control device can compensate for the difference between the controlled state determined in the unit 34 and the controlled state substantially set in the inverter IV in the dead time DT.

Still further, the current or the combination of the magnetic flux and the torque is predicted as a controlled variable of the generator 10. However, only the magnetic flux or only the torque may be predicted as a controlled variable of the generator 10. Further, the current and the torque may be predicted as controlled variables of the generator 10. When the torque is predicted as a controlled variable, a hardware element only used to detect the torque actually generated in the generator 10 may be located in the control system. In this case, the control device can receive the actual torque without calculating the torque from the detected value of a physical quantity from which the controlled variable can be calculated. However, when torques expected in several control periods subsequent to the succeeding control period are predicted one after another, it is preferred that the current be also predicted for the purpose of determining the polarity of the current with high precision.

Still further, in each embodiment, the difference calculus such as forward difference calculus is used to set discrete variables in the model prediction control applied in the continuous system. However, in place of the difference calculus, the linear multistage model may be used to set discrete values in N stages (N≧2) in the model prediction control, or Runge-Kutta method may be used to set discrete values in the model prediction control.

Still further, in each embodiment, only the fundamental wave component contained in the current is considered to predict the current in the model prediction control. However, the model considering higher harmonic wave components contained in the inductance and/or the induced voltage in addition to the fundamental wave component may be used. Further, the present invention is not limited to this model prediction control, but a map stored in a memory may be used. When the control device receives the voltage V=(Vd, Vq) and the electrical angle rotational speed ω as input parameters of the map, the predicted current denoting an output parameter of the map is determined from the map. The ambient temperature may be added as another input parameter of the map. The map indicates the relation between discrete values of the input parameters and values of the output parameter.

Still further, in each embodiment, the model of predicting the current is used while disregarding iron loss caused in the generator 10. However, a model considering iron loss may be used.

Still further, in each embodiment, the torque is set as the final controlled variable of the electric rotating machine represented by the generator 10, regardless of whether the torque is predicted. However, the rotational speed or the like in the generator 10 may be set as the final controlled variable.

Still further, as a model used for the prediction of the controlled variable of the electric rotating machine, the present invention is not limited to the model in the rotational coordinate system, but a model in the three-phase alternating current coordinate system may be applied for the present invention.

As the electric rotating machine, the interior permanent magnet synchronous motor is used in the embodiments. However, any synchronous motor such as a surface magnet synchronous motor or a field winding synchronous motor can be used as the electric rotating machine. Further, any induction electric rotating machine such as an induction motor or the like may be used.

Further, the electric rotating machine is mounted on a hybrid vehicle in the embodiments. However, the electric rotating machine may be mounted on any vehicle such as an electric vehicle. Further, the electric rotating machine is not limited to a primary engine of a vehicle, but may be used as a secondary engine.

Moreover, in the embodiments, the high-voltage battery 12 having positive and negative terminals is adopted as the direct current source, and the terminals are directly connected with the switching elements of the inverter IV. However, output terminals of a converter boosting the output voltage of the battery 12 may be directly connected with the switching elements of the inverter IV.

Furthermore, in the embodiments, the inverter IV having the switching elements made of IGBT is adopted as a power inverting circuit. However, each switching element of the inverter IV may be made of a power MOS FET (Metal Oxide Semiconductor Field Effect Transistor).

What is claimed is:
1. A control device which controls a controlled variable of an electric rotating machine by controlling a power inverting circuit to be set in one of a plurality of controlled states corresponding to respective controlled voltages of the power inverting circuit, comprising:
   a state determining section that determines one of the controlled states as a controlled state to be set in the power inverting circuit; and
   a control section that controls the power inverting circuit to change one controlled state, already set in the power inverting circuit, to the controlled state determined by the state determining section and to apply the controlled voltage, corresponding to the controlled state determined by the state determining section, to the electric rotating machine,
   the state determining section comprises:
      a current polarity judging unit that judges a polarity of a current which flows through the electric rotating machine in response to the controlled voltage corresponding to the controlled state already set in the power inverting circuit;

a predicting unit that predicts the controlled variable of the electric rotating machine from information, indicating one controlled state to be set in the power inverting circuit, while performing the prediction based on the polarity of the current judged by the current polarity judging unit when the controlled state indicated by the information differs from the controlled state already set in the power inverting circuit, for each of the controlled states indicated by the information; and a state determining unit that determines the controlled state, to be set in the power inverting circuit, from the predicted controlled variables corresponding to the controlled states.

2. The control device according to claim 1, wherein the current polarity judging unit calculates an intermediate controlled voltage of the power inverting circuit, each time the controlled state indicated by the information differs from the controlled state already set in the power inverting circuit, from the judged polarity of the current, and the predicting unit performs the prediction based on the intermediate controlled voltage.

3. The control device according to claim 2, wherein the power inverting circuit has a first switching element, a second switching element and two freewheel diodes connected with input and output terminals of the respective switching elements, the first switching element set in an on state or an off state electrically connects or disconnects a positive electrode of a direct current power source to or from a terminal of the electric rotating machine, the second switching element set in the on or off state electrically connects or disconnects a negative electrode of the power source to or from the terminal of the electric rotating machine, each controlled state of the power inverting circuit corresponds to one of a plurality of patterns of the on and off states set in the switching elements, the state determining section determines one controlled state to be set in the power inverting circuit every control period of time, the control section has already determined the controlled state, already set in the power inverting circuit in a first control period, the control section controls the switching elements to be set in the off state together in a transfer time succeeding the first control period, the current polarity judging unit comprises:

a state difference judging block that judges in the first control period whether or not the controlled state indicated by the information differs from the controlled state already set in the power inverting circuit;

a current polarity judging block that judges from a flow direction of the current whether the polarity of the current is positive or negative; and a dead time voltage vector calculating block that calculates the intermediate voltage vector to be set in the transfer time, when the state difference judging block judges that the controlled state indicated by the information differs from the controlled state already set in the power inverting circuit, such that the intermediate voltage vector corresponds the on state of the first switching element and the off state of the second switching element in response to a negative polarity of the current judged by the current polarity judging block and corresponds the off state of the first switching element and the on state of the second switching element in response to a positive polarity of the current judged by the current polarity judging block, and the predicting unit predicts the controlled variable from the intermediate voltage vector set in the transfer time and the controlled state of the information set in a state setting time which succeeds the transfer time and is placed in a control period succeeding the first control period.

4. The control device according to claim 2, wherein;

the power inverting circuit has a first switching element, a second switching element and two freewheel diodes connected with input and output terminals of the respective switching elements, the first switching element set in an on state or an off state electrically connects or disconnects a positive electrode of a direct current power source to or from a terminal of the electric rotating machine, the second switching element set in the on or off state electrically connects or disconnects a negative electrode of the power source to or from the terminal of the electric rotating machine, each controlled state of the power inverting circuit corresponds to one of a plurality of patterns of the on and off states set in the switching elements, the state determining section determines one controlled state to be set in the power inverting circuit every control period of time, the control section having already determined the controlled state, already set in the power inverting circuit in a first control period, the control section controls the switching elements to be set in the off state together in a transfer time succeeding the first control period, the current polarity judging unit comprises:

a state difference judging block that judges in the first control period whether or not the controlled state indicated by the information differs from the controlled state already set in the power inverting circuit;

a current polarity judging block that judges from a flow direction of the current whether the polarity of the current is positive or negative;

a state judging unit that judges whether the controlled state indicated by the information corresponds to the on or off state of the first switching element; and a dead time voltage vector calculating block that calculates the intermediate voltage vector to be set in the transfer time, when the state difference judging block judges that the controlled state indicated by the information differs from the controlled state already set in the power inverting circuit, such that the intermediate voltage vector corresponds to the off state of the first switching element and the on state of the second switching element, in response to both a positive polarity of the current judged by the current polarity judging block and the on state of the first switching element corresponding to the control led state indicated by the information, and corresponds to the on state of the first switching element and the off state of the second switching element in response to both a negative polarity of the current judged by the current polarity judging block and the off state of the first switching element corresponding to the controlled state indicated by the information, and the predicting unit predicts the controlled variable from the intermediate voltage vector set in the transfer time and the controlled state of the information set in a state setting time which succeeds the transfer time and is placed in a control period succeeding the first control period.

5. The control device according to claim 2, wherein the predicting unit predicts the controlled variable of the electric rotating machine from the information, indicating one controlled state of the power inverting circuit, the intermediate controlled voltage and information, indicating the current flowing through the electric rotating machine.

6. The control device according to claim 1, wherein
the state determining section determines the controlled state, to be set in the power inverting circuit, every control period of time,
the state determining section further comprises an information producing unit that produces the information, indicating each of the controlled states, every control period of time,
the current polarity judging unit determines one of the controlled states as an intermediate controlled voltage of the power inverting circuit to be set in a transfer time which succeeds a state setting time of a first control period in which one controlled state is already set in the power inverting circuit, each time the controlled state indicated by the information of the information producing unit differs from the controlled state already set in the power inverting circuit, from the judged polarity of the current, the controlled state indicated by the information and the controlled state already set in the power inverting circuit,
the predicting unit predicts the controlled variable of the electric rotating machine from each of the controlled states, indicated by the information of the information producing unit, to be set in the power inverting circuit in a state setting time of a second control period of time succeeding the transfer time and the intermediate controlled voltage of the current polarity judging unit to be set in the transfer time, and
the control section controls the power inverting circuit to change the controlled state, already set in the power inverting circuit in the state setting time of the first control period, to the controlled state determined by the state determining section and set in the state setting time of the second control period.

7. The control device according to claim 1, wherein the current polarity judging unit calculates a correction of the controlled variable from the judged polarity of the current when the controlled state indicated by the information differs from the control led state already set in the power inverting circuit, and the predicting unit predicts a base value of the controlled variable from the information, indicating one controlled state to be set in the power inverting circuit, and predicts a sum of the base value and the correction as the controlled variable predicted by the predicting unit.

8. The control device according to claim 1, wherein the current polarity judging unit calculates a voltage applying time from the judged polarity of the current and the control period when the controlled state indicated by the information differs from the control led state already set in the power inverting circuit, and the predicting unit predicts the controlled variable from the information on the assumption that the controlled voltage corresponding to the controlled state indicated by the information is applied to the electric rotating machine during the voltage applying time.

9. The control device according to claim 1, wherein the power inverting circuit has a first switching element, a second switching element and two freewheel diodes connected with input and output terminals of the respective switching elements, the first switching element set in an on state electrically connects a positive electrode of a direct current power source to a terminal of the electric rotating machine, the first switching element set in an off state electrically disconnects the positive electrode of the direct current power source from the terminal of the electric rotating machine, the second switching element set in the on state electrically connects a negative electrode of the direct current power source from the terminal of the electric rotating machine, the second switching element set in the off state electrically disconnects the negative electrode of the direct current power source from the terminal of the electric rotating machine, each controlled state of the power inverting circuit corresponds to one of a plurality of patterns of the on and off states set in the switching elements, the control unit sets the switching elements at the off state together in a transfer time succeeding a state setting time of a first control period, when the controlled state indicated by the information differs from the controlled state already set in the power inverting circuit in the state setting time of the first control period, such that the current flows into the electric rotating machine while passing through the freewheel diode corresponding to the second switching element when the polarity of the current is positive and such that the current flows out the electric rotating machine while passing through the freewheel diode corresponding to the first switching element when the polarity of the current is negative, the control unit sets one of the switching elements in the on state in a state setting time of a second control period succeeding the transfer time according to the control led state determined by the state determining unit, and the predicting unit predicts the controlled variable of the electric rotating machine from information which indicates the controlled state of the power inverting circuit, corresponding to the off state of the first switching element and the on state of the second switching element, in the transfer time when the polarity of the current is positive and indicates the controlled state of the power inverting circuit, corresponding to the on state of the first switching element and the off state of the second switching element, in the transfer time when the polarity of the current is negative.

10. The control device according to claim 1, wherein the electric rotating machine has a plurality of terminals corresponding to respective phases, the power inverting circuit has a plurality of switching elements corresponding to each phase and a plurality of freewheel diodes connected with input and output terminals of the respective switching elements such that each switching element set in an on state electrically connects one of a positive electrode or a negative electrode of a direct current power source to the corresponding terminal of the electric rotating machine while each switching element set in an off state electrically disconnects one electrode of the direct current power source from the corresponding terminal of the electric rotating machine, each controlled state of the power inverting circuit corresponds to one of a plurality of patterns of the on and off states of the switching elements, the control unit specifies the switching elements, corresponding to one phase and being operated to change the controlled state already set in the power inverting circuit in a first control period to the controlled state determined by the state determining unit, when the controlled state indicated by the information differs from the controlled state already set in the power inverting circuit, and the control unit sets the specified switching elements at the off state together in a transfer time succeeding a state setting time of the first control period, such that the current passes through one of the freewheel diodes corresponding to the specified switching elements, and controls the specified switching elements in a state setting time of a second control period succeeding the transfer time to be set in the pattern corresponding to the controlled state determined by the state determining unit.

11. The control device according to claim 1, wherein the state determining unit calculates a difference between each predicted controlled variable and an instructed value and determines the controlled state corresponding to the difference having a minimum value among values of the differences.

12. The control device according to claim 1, wherein the controlled variable of the electric rotating machine is an electric current flowing through the electric rotating machine, a torque generated in the electric rotating machine, or a magnetic flux induced in the electric rotating machine.

13. A control device which controls a controlled variable of an electric rotating machine by controlling a power inverting circuit to be set in one of a plurality of controlled states corresponding to respective controlled voltages of the power inverting circuit, comprising:

a state determining section that determines one of the controlled states as a controlled state to be set in the power inverting circuit; and a control section that controls the power inverting circuit to change one controlled state, already set in the power inverting circuit, to the controlled state, determined by the state determining section and to apply the controlled voltage, corresponding to the controlled state determined by the state determining section, to the electric rotating machine, the state determining section comprises:

a difference calculating unit that receives a voltage actually applied to the electric rotating machine by the power inverting circuit and calculates a difference between the actual voltage and the controlled voltage corresponding to the controlled state of the power inverting circuit already set in the power inverting circuit;

a predicting unit that receives information indicating each of the controlled states to be set in the power inverting circuit, corrects the controlled voltage corresponding to the control led state indicated by the received information to a corrected voltage according to the difference calculated by the difference calculating unit, and predicts the controlled variable of the electric rotating machine from the corrected voltage, to be applied to the electric rotating machine, for each of the controlled states indicated by the information; and a state determining unit that determines one controlled state from the predicted controlled variables corresponding to the controlled states.

14. The control device according to claim 13, wherein the predicting unit sets the corrected voltage such that the controlled voltage corresponding to the controlled state determined by the state determining unit approaches the voltage actually applied to the electric rotating machine as compared with the controlled voltage corresponding to the controlled state determined by the state determining unit from the controlled voltage corresponding to the controlled state indicated by the received information.

15. The control device according to claim 13, wherein the controlled variable of the electric rotating machine is an electric current flowing through the electric rotating machine, a torque generated in the electric rotating machine, or a magnetic flux induced in the electric rotating machine.

* * * * *